US009281552B2

(12) United States Patent
Virtanen

(10) Patent No.: US 9,281,552 B2
(45) Date of Patent: Mar. 8, 2016

(54) METHOD FOR PRODUCING AN ANTENNA ELEMENT OF AN RFID TRANSPONDER

(71) Applicant: SMARTRAC IP B.V., Amsterdam (NL)

(72) Inventor: Juhani Virtanen, Tampere (FI)

(73) Assignee: SMARTRAC IP B.V., Amsterdam (NL)

( * ) Notice: Subject to any disclaimer, the term of this patent is extended or adjusted under 35 U.S.C. 154(b) by 0 days.

(21) Appl. No.: 14/363,325

(22) PCT Filed: Nov. 29, 2012

(86) PCT No.: PCT/EP2012/073940
§ 371 (c)(1),
(2) Date: Jun. 6, 2014

(87) PCT Pub. No.: WO2013/083470
PCT Pub. Date: Jun. 13, 2013

(65) Prior Publication Data
US 2014/0317909 A1    Oct. 30, 2014

Related U.S. Application Data

(60) Provisional application No. 61/568,896, filed on Dec. 9, 2011.

(51) Int. Cl.
*H01P 11/00*    (2006.01)
*H01Q 1/12*    (2006.01)
(Continued)

(52) U.S. Cl.
CPC .............. *H01Q 1/12* (2013.01); *G06K 19/0726* (2013.01); *G06K 19/0775* (2013.01);
(Continued)

(58) Field of Classification Search
CPC ...... H01Q 1/22; H01Q 9/285; Y10T 29/49016
USPC .............................. 29/600–601; 343/700 MS
See application file for complete search history.

(56) References Cited

U.S. PATENT DOCUMENTS 5,757,199 A * 5/1998 Maruyama ................ 324/750.03
7,036,741 B2 * 5/2006 Usami et al. .................. 235/492
(Continued)

FOREIGN PATENT DOCUMENTS

EP          2357705 A1    8/2011
JP          2005-063201   3/2005
(Continued)

OTHER PUBLICATIONS

International Search Report and Written Opinion of the International Searching Authority; PCT/EP2012/073940; Feb. 20, 2013.
(Continued)

*Primary Examiner* — Minh Trinh
(74) *Attorney, Agent, or Firm* — Ziegler IP Law Group, LLC

(57) ABSTRACT

A method for producing a radio frequency identification transponder includes
forming a first groove in a conductive sheet such that a portion of said conductive sheet surrounds the first groove,
attaching an RFID chip to the conductive sheet after the first groove has been formed such that the first groove is located between a first connecting element of the chip and a second connecting element of the chip, and
forming a second groove in the conductive sheet after the chip has been attached so as to form an antenna element of said transponder.

19 Claims, 22 Drawing Sheets

(51) Int. Cl.
  *G06K 19/07*    (2006.01)
  *G06K 19/077*   (2006.01)
  *H01Q 1/22*     (2006.01)
  *H01Q 1/38*     (2006.01)

(52) U.S. Cl.
  CPC ....... *G06K 19/07773* (2013.01); *H01Q 1/2208* (2013.01); *H01Q 1/38* (2013.01); *Y10T 29/49016* (2015.01); *Y10T 29/53174* (2015.01)

(56) References Cited

U.S. PATENT DOCUMENTS

| | | | |
|---|---|---|---|
| 7,201,328 B2* | 4/2007 | Usami et al. | 235/492 |
| 8,654,012 B2 | 2/2014 | Kim et al. | |
| 2005/0093677 A1* | 5/2005 | Forster et al. | 340/10.1 |
| 2005/0134460 A1* | 6/2005 | Usami | 340/572.7 |
| 2008/0179404 A1* | 7/2008 | Finn | 235/492 |
| 2010/0314453 A1 | 12/2010 | Kim et al. | |
| 2011/0247197 A1* | 10/2011 | Finn | 29/600 |
| 2011/0247198 A1 | 10/2011 | Vicard | |
| 2014/0317979 A1* | 10/2014 | Carlson | 42/1.06 |

FOREIGN PATENT DOCUMENTS

| | | |
|---|---|---|
| JP | 2010253900 | 11/2010 |
| KR | 10-2010-0135119 | 12/2010 |

OTHER PUBLICATIONS

English Translation of Korean Office Action; KR 10-2014-7018796; Dated Nov. 24, 2014.
Notification of Reason for Refusal, JP Patent Application No. 2014-545183, mailed Oct. 28, 2014.
Mexican Office Action for Mexican Patent Application No. MX/a/2014/006628 dated Jun. 8, 2015.

* cited by examiner

METHOD FOR PRODUCING AN ANTENNA ELEMENT OF AN RFID TRANSPONDER

FIELD OF THE INVENTION

The aspects of the present disclosure relate to RFID transponders.

BACKGROUND

Radio frequency identification (RFID) tags may be attached to items or otherwise associated with items in order to identify the items and/or to track movements of the items. Information stored in the tags may be read in a wireless manner by using a portable or stationary reader.

A radio frequency identification tag comprises a transponder, which responds to an interrogation signal by transmitting a response. The response transmitted from the tag to a reader may contain information, which specifies e.g. an identification number of the item associated with the tag. The tag may be attached to an item by optional attachment means.

RFID tags may be attached to an item in order to provide wireless identification of the item. An RFID tag may specify e.g. a serial number of the item, manufacturing batch of the item and/or a price of the item. An RFID tag may comprise a transponder, which in turn may comprise one or more antenna elements 10a, 10b and an RFID chip.

Referring to FIG. 1, the antenna elements 10a, 10b may be produced on a substrate 90 by chemical etching. The substrate 90 may be e.g. PET (Polyethylene terephthalate). After the final shape of the antenna elements 10a, 10b has been etched, an RFID chip 50 may be attached to the antenna elements 10a, 10b e.g. by using anisotropically conductive adhesive.

Precise positioning of the contact elements 52a, 52b of the RFID chip with respect to the terminal parts 12a, 12b of the antenna elements 10a, 10b may be required in order to ensure consistent radio frequency performance.

SUMMARY

The aspects of the present disclosure are directed to providing a method for producing an RFID transponder. Another aspect of the present disclosure is to provide an apparatus for producing RFID transponders. A further aspect of the present disclosure is to provide an RFID transponder.

According to a first aspect of the invention, there is provided a method for producing a radio frequency identification transponder, said transponder comprising a radio frequency identification chip and one or more antenna elements, the method comprising:
  forming a first groove in a conductive sheet such that a portion of said conductive sheet surrounds the first groove,
  attaching the chip (50) to the conductive sheet after the first groove has been formed such that the first groove is located between a first connecting element of the chip and a second connecting element of the chip, and
  forming a second groove in the conductive sheet after the chip has been attached so as to form an antenna element of said transponder.

According to a second aspect of the invention, there is provided an apparatus for producing a radio frequency identification transponder, wherein the apparatus is arranged:
  to provide a first groove in a conductive sheet,
  to attach a radio frequency identification chip onto a conductive sheet after the first groove has been provided such that the first groove is located between a first connecting element of the chip and a second connecting element of the chip, and
  to form a second groove in the conductive sheet by using a laser beam after the chip has been attached so as to form an antenna element of said transponder.

A radio frequency identification (RFID) transponder comprises a radio frequency identification (RFID) chip connected to one or more antenna elements. The antenna elements may be cut from a conductive sheet by a laser. The antenna elements or the ends of a coil antenna should be separated each other by a groove. However, as the chip overlaps the separating groove, there is a risk of damaging the chip with the cutting laser beam.

The method for producing an RFID transponder comprises:
  forming a first groove (C1) in a conductive sheet (70) such that a portion (OR1) of said conductive sheet (70) surrounds the first groove (C1),
  attaching the chip (50) to the conductive sheet (70) after the first groove (C1) has been formed such that the first groove (C1) is located between a first connecting element (52a) of the chip (50) and a second connecting element (52b) of the chip (50),
  cutting a second groove (C2) in the conductive sheet (70) after the chip (50) has been attached so as to form an antenna element (10a) of said transponder (100).

The risk of damaging the chip may be substantially reduced when the first groove is formed before attaching the chip 50.

The final form of the antenna elements may be subsequently cut from the conductive sheet after the chip has been attached to the conductive sheet. Thus the position of the antenna elements may be accurately defined with respect to the chip, and the risk of damaging the chip laser beam may be substantially reduced.

The strength and the rigidity of the conductive sheet may be substantially reduced after one or more grooves extending to the edge of the sheet have been cut. Cutting of long internal protrusions may also reduce the strength and the rigidity of the conductive sheet. Holding of the sheet firmly in place may also become more difficult after cutting one or more grooves extending to the edge of the sheet. Thus, the accuracy of positioning the chip with respect to the sheet may be improved by attaching of the chip to the sheet before one or more grooves extending to the edge of the sheet have been cut and/or before long internal protrusions are formed. In particular, accurate positioning the chip with respect to a the first (preliminary) groove may be facilitated by attaching (bonding) of the chip to the sheet before one or more grooves extending to the edge of the sheet have been cut and/or before long internal protrusions are formed.

The electrical signals provided by the antenna elements of an RFID tag may be very weak. The impedance of the electrical contact between the chip 50 and the antenna element may be critical. Thanks to the invention, variations in the impedance may be reduced and more consistent and reliable RFID operation may be provided for transponders of a manufacturing batch.

By cutting the final form of the terminal portion of an antenna element after the chip has been attached, deviations in the positioning of the chip may be compensated.

Thanks to attaching the chip to the conductive sheet before cutting the final form of the antenna elements, the conductive sheet can be held in place firmly. This may help to minimize the adverse effect of chip misalignment.

In an embodiment, a substantially substrateless RFID transponder may be provided at an intermediate step of the manufacturing process.

In an embodiment, the antenna elements of the RFID transponder are not attached to a dielectric substrate sheet, i.e. the RFID transponder may have a substantially substrateless antenna. For example, less than 20% of the surface area of the antenna element (10a, 10b, CA1) may be covered by a dielectric material.

Thanks to the substrateless structure, less waste material may be produced during manufacturing of RFID transponders.

In an embodiment, cheaper face and/or cheaper cover materials may be used in an RFID tag.

In an embodiment, a substantially substrateless RFID transponder may be produced. The transponder may be subsequently attached to an item, i.e. the surface of the item may be arranged to support the structure of the RFID transponder.

In an embodiment, lower manufacturing costs may be expected.

Certain issues have to be solved when producing antenna elements which are not attached to a substrate sheet. One of the most challenging issues is maintaining the form and dimensions of the antenna elements during cutting of the antenna elements and when rapidly moving the transponder or a semi-manufactured transponder. The form of the antenna elements may be maintained e.g. by using links, by using bridges and/or by using holding members.

In an embodiment, the antenna element is connected to an outer portion of a conductive sheet by the links. The links help to maintain the correct form of the antenna element during cutting of the shape of the antenna element. After cutting, the antenna element may be separated from the remaining portion of the conductive sheet, e.g. by breaking the links.

In an embodiment, dimensions and/or shapes of the antenna elements produced by a manufacturing apparatus may be rapidly changed.

In an embodiment, a plurality of semi-manufactured (i.e. not finished) transponders comprising a chip attached to a conductive sheet may be stored, and the final form of the antenna elements may be cut e.g. after several hours of several days after the chip has been attached to the sheet. This may improve the speed at which the manufacturing process may be adapted to rapidly produce transponders having different antenna shapes. A plurality of semi-manufactured transponders may be stored e.g. a single roll, which comprises several chips attached to the same substantially continuous conductive sheet.

BRIEF DESCRIPTION OF THE DRAWINGS

In the following examples, the embodiments of the invention will be described in more detail with reference to the appended drawings, in which.

DETAILED DESCRIPTION

Figure 1:
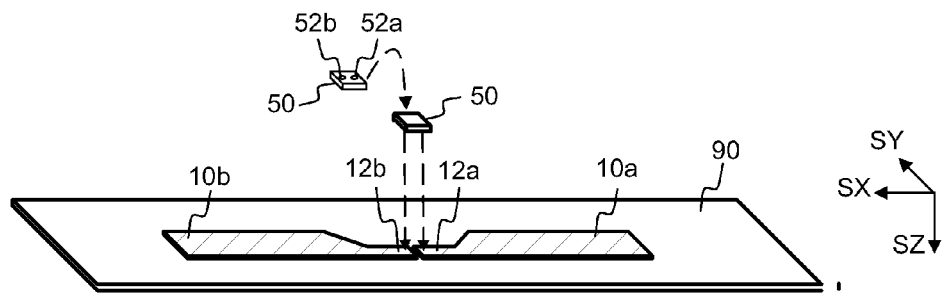
FIG. 1 shows, in a three dimensional view, a known method for manufacturing an RFID tag.
Figure 2:
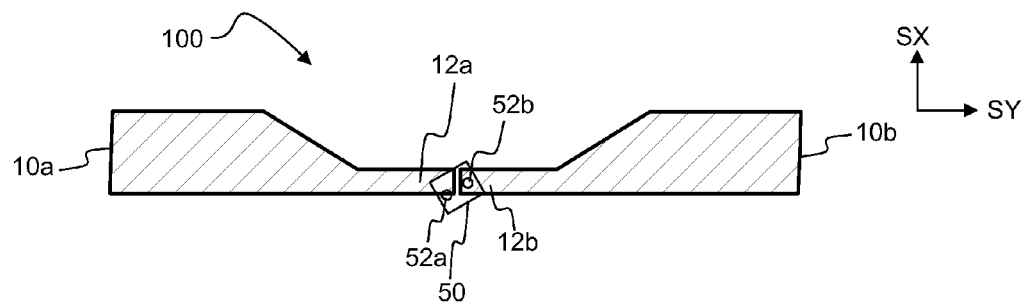
FIG. 2 shows, in a top view, misalignment of an RFID chip with respect to antenna elements.

Referring to FIG. 2, a radio frequency identification chip 50 may be misplaced with respect to antenna elements 10a, 10b in a situation where the antenna elements 10a, 10b have been formed before bonding the contact elements 52a, 52b of the chip 50 to the terminal portions 12a, 12b of the antenna elements 10a, 10b.

SX, SY, and SZ denote orthogonal directions. The conductive sheet 70 may be (substantially) in a plane defined by the directions SX and SY. The direction SZ may be substantially perpendicular to the plane of the conductive sheet.

The electrical signals provided by the antenna elements of an RFID tag may be very weak. Angular and/or translational misalignment of the chip 50 may have an adverse effect on the impedance of the electrical contact between the chip 50 and the antenna elements. The chip 50 may be so severely displaced with respect to the correct position that it prevents operation of the transponder 100.

Figure 3:
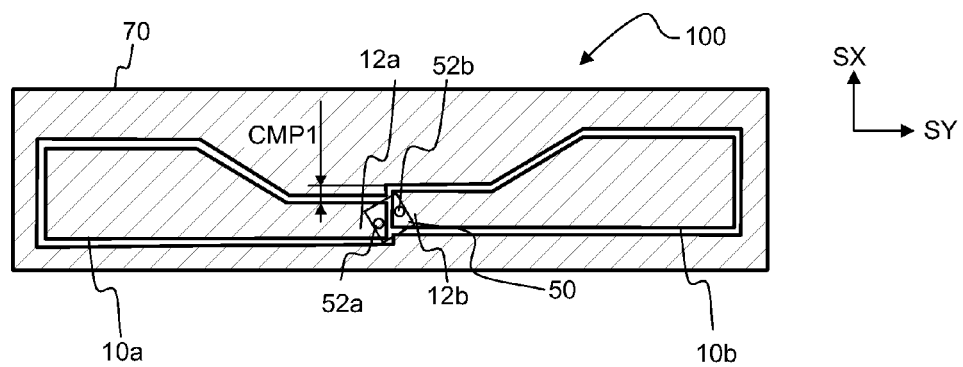
FIG. 3 shows, in a top view, cutting an antenna element in order to compensate misalignment of the RFID chip.

Referring to FIG. 3, the error in the position of the chip 50 may be at least partly compensated by cutting at least a portion of an antenna element 10a, 10b after the chip 50 has been attached to the conductive material of the antenna elements 10a, 10b. For example, the terminal portion 12a of a first antenna element 10a may be displaced by a distance CMP1 with respect to the terminal portion 12b of a second antenna element 10b in order to compensate the misalignment of the chip 50.

The contact elements 52a, 52b of an RFID chip 50 may be bonded to the conductive sheet 70 before the final shape of the terminal portions 12a, 12b of the antenna elements 10a, 10b is cut. The contact elements 52a, 52b may be electrically connected to the conductive sheet before cutting the final form of the terminal portions 12a, 12b.

The conductive sheet 70 may comprise e.g. aluminum (Al), copper (Cu), nickel (Ni), tin (Sn), zinc (Zn), iron (Fe), silver (Ag), gold (Au), graphite (C), magnesium (Mg), titanium (Ti), and/or lead (Pb). Environmentally friendly low-cost materials may be preferred. In particular, the conductive sheet 70 may consist of aluminum or copper. The thickness of the conductive sheet 70 may be e.g. in the range of 0.002 mm to 0.02 mm, in the range of 0.02 mm to 0.08 mm, or in the range of 0.08 mm to 0.2 mm.

The contact elements 52a, 52b of the chip 50 may comprise e.g. copper, aluminum, tin, silver, nickel, and/or gold.

The contact elements 52a, 52b may be contact bumps. The contact elements 52a, 52b may be contact pads.

The RFID chip 50 may comprise more than two contact elements 52a, 52b. In particular, the RFID chip 50 may have four contact elements. In particular, two contact elements may be bonded to the same antenna element in order to provide more reliable electrical contact and/or in order to provide mechanically stronger connection.

The longest dimension of the chip 50 may be e.g. smaller than or equal to 5 mm, preferably smaller than 2 mm.

Figure 4A:
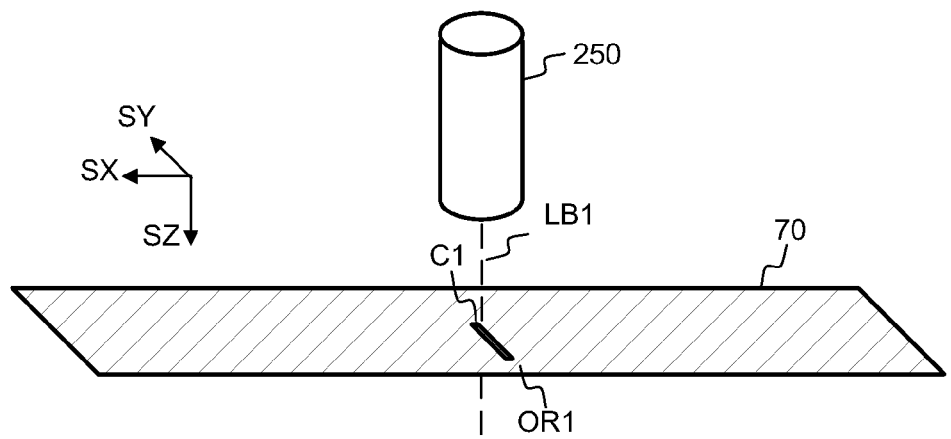
FIG. 4a shows, in a three dimensional view, cutting a preliminary groove in a conductive sheet.

Referring to FIG. 4a, a groove C1 may be formed in a conductive sheet 70 such that the conductive sheet C1 completely surrounds to the groove C1. The surrounding outer portion OR1 may stabilize the dimensions of the groove C1 during subsequent handling. In other words, the surrounding outer portion OR1 may increase the mechanical strength of the semi-manufactured transponder.

In order to provide galvanic separation, the groove C1 extends through the sheet 70 (i.e. from the upper side to the lower side). The groove C1 may also be called as a slit or slot.

In particular, the groove C1 may be cut by a laser beam LB1 generated by a laser 250. The groove C1 may be cut by heating and/or ablating the conductive material of the sheet 70 with the laser beam LB1.

Forming the groove C1 with the laser may be advantageous e.g. because this allows rapid and accurate changing of the dimensions of the groove C1. Consequently, transponders having different shapes and sizes may be produced with the same manufacturing apparatus.

The laser cutting may be performed without using liquid chemicals.

The same laser 250 may be used to cut the preliminary groove C1 and the final shape of the antenna elements after the chip 50 has been attached to the conductive sheet 70.

Alternatively, the first groove C1 may be formed e.g. by etching or die-cutting. Etching and die-cutting may be low-cost methods of mass production. It may be more difficult to change the cutting dimensions in an etching or die-cutting process than in a laser cutting process.

Figure 4B:
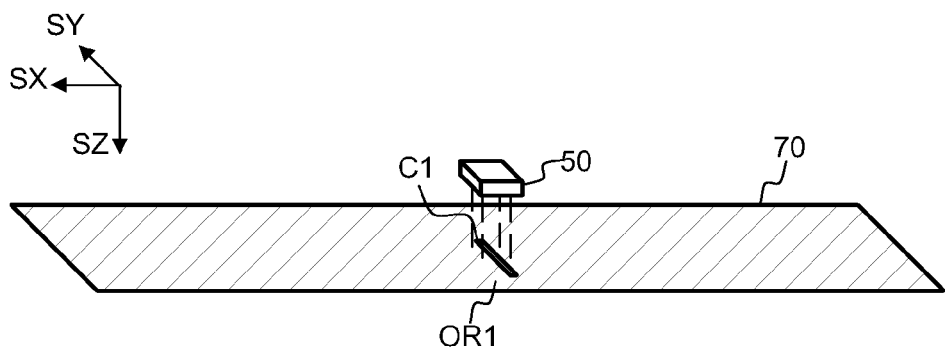
FIG. 4b shows, in a three dimensional view, attaching an RFID chip to the conductive sheet after the preliminary groove has been formed.

Referring to FIG. 4b, an RFID chip may be attached to the conductive sheet 70 after the first groove C1 has been formed.

The attaching may comprise forming a first electrical connection between a first connecting element 52a of the chip and the conductive sheet 70. The attaching may comprise forming a second electrical connection between a second connecting element 52a of the chip and the conductive sheet 70. The connecting elements 52a, 52b may be bonded to the sheet 70 such that the first groove C1 is located between the first connecting element 52a and the second connecting element 52a.

The electrical connection may be formed e.g. by welding, soldering and/or by using an anisotropically conductive adhesive.

The attaching may comprise pushing the connecting elements 52a, 52b of the chip 50 against the conductive sheet 70. In particular, forming an electrical connection by the anisotropically conductive adhesive may comprise pushing the chip 50 against the sheet 70. The surrounding portion OR1 may help to maintain the dimensions of the groove C1 also during the attaching. Without the surrounding portion OR1, the pushing force could alter the dimensions of the groove C1, i.e. the sheet might be deformed without the surrounding portion C1.

Figure 4C:
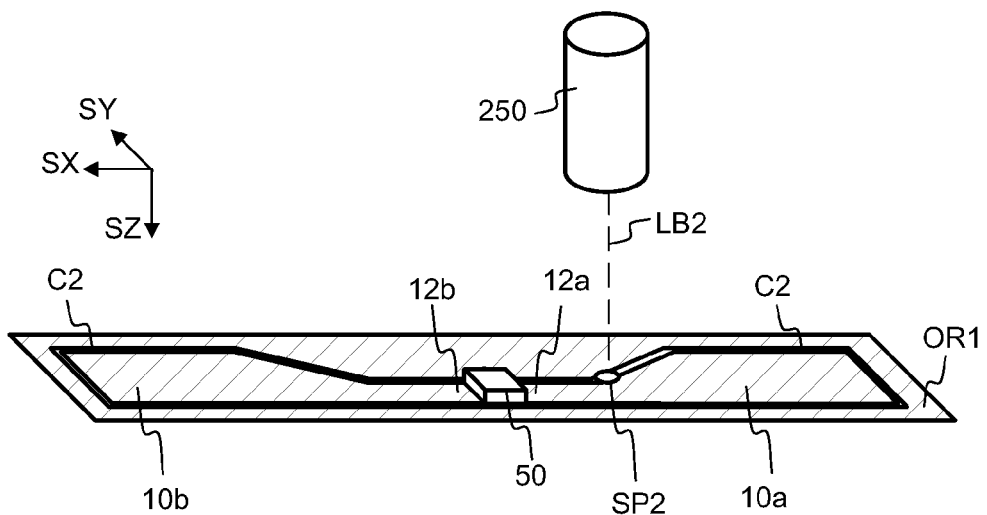
FIG. 4c shows, in a three dimensional view, cutting the conductive sheet by a laser beam after the RFID chip has been attached to the conductive sheet so as to define the form of the antenna elements of an RFID transponder.

Referring to FIG. 4c, the final form of the antenna elements 10a, 10b may be cut after the chip 50 has been attached to the conductive sheet 70. An antenna element 10a may be formed by cutting a second groove C2 after the chip 50 has been attached to the conductive sheet 70. The second groove C2 may be cut with a laser beam LB2. Thanks to cutting with the laser beam LB2, the position of the terminal portion 12a of the antenna element 10a may be accurately defined with respect to the chip 50.

The antenna elements of the transponder may be very easily deformed due to transverse forces (in the directions SX and/or SY). Cutting with the laser beam LB2 may generate very small or negligible transverse forces.

The laser beam LB2 may be provided with the same laser 250 as the first laser beam LB1, or by a different laser. The second groove C2 may be cut by using several laser beams obtained from several lasers.

A high-intensity laser spot SP2 may be moved e.g. in the directions SX and SY in order to cut the desired shape of the portions 12a, 12b.

Bonding and cutting may be carried out by using the same laser 250 or by using different types of lasers. For example, bonding between a contact element 52a and the conductive sheet 70 may be made by using a laser beam LB0 which effectively heats the interface between the terminal portion 12a and contact element 52a, wherein the shape of the terminal portion 12a may be cut by using a different laser beam LB2 which ablates material away from the sheet 70 with a lower heating effect.

Advantageously, the laser may provide a short pulse length and high intensity in order to ablate material away from the conductive sheet 70, without excessively heating the conductive sheet 70 and/or without excessively heating the chip 50.

In particular, the cutting laser 250 may be e.g. an excimer laser, a semiconductor laser, a carbon dioxide laser or a YAG-laser.

The material ablated away from the conductive sheet may form metal particles or metal oxide particles, which may be carried away by using a gas stream. The particles may be collected into a gas cleaning device (not shown).

FIGS. 5a-5e show, in a top view, different stages of manufacturing a transponder.

Figure 5A:
FIG. 5a shows, in a top view, a conductive sheet.

FIG. 5a shows a piece of conductive sheet 70.

Figure 5B:
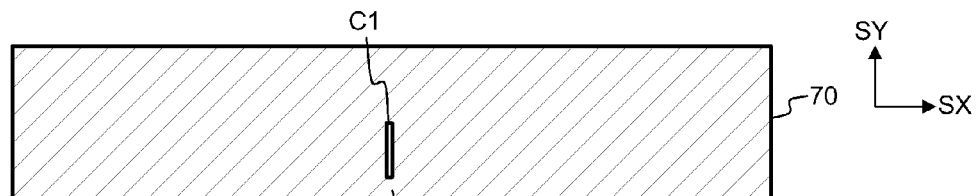
FIG. 5b shows, in a top view, cutting a preliminary groove to a conductive sheet.

FIG. 5b shows a first groove C1 formed in the conductive sheet 70. The surrounding portion OR1 facilitates subsequent handling of the semi-manufactured product, by maintaining dimensions of the groove C1.

Figure 5C:
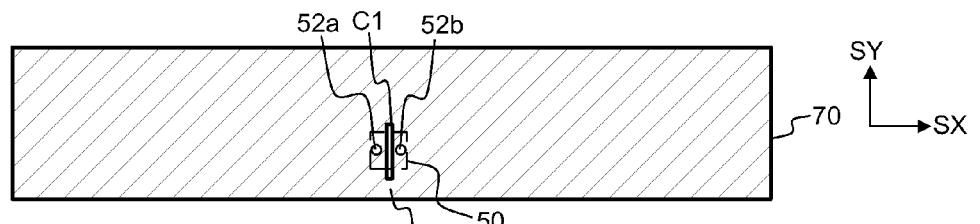
FIG. 5c shows, in a top view, attaching an RFID chip to the conductive sheet after the preliminary groove has been formed.

FIG. 5c shows attaching the chip 50 onto the sheet 70 after the groove C1 has been formed.

Figure 5D:
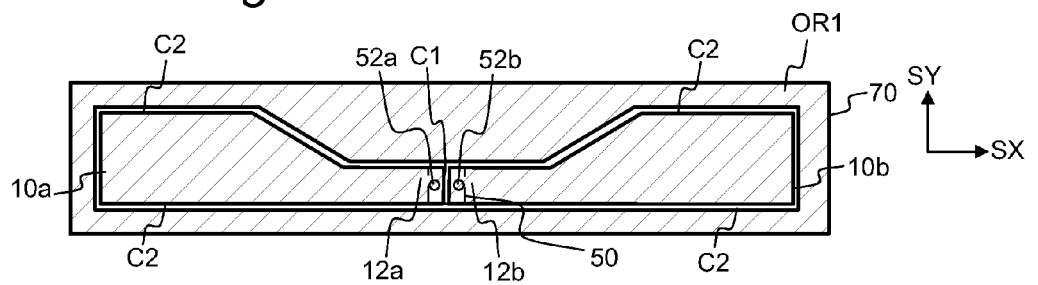
FIG. 5d shows, in a top view, cutting the conductive sheet after the RFID chip has been attached to the conductive sheet so as to define the form of the antenna elements of an RFID transponder.

FIG. 5d shows cutting a second groove C2 after the chip 50 has been attached onto the sheet 70.

Figure 5E:
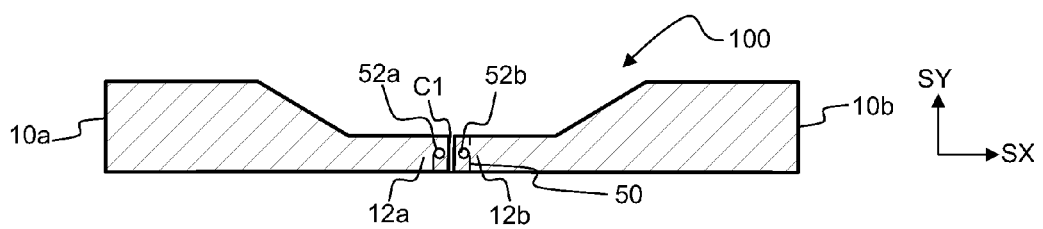
FIG. 5e shows, in a top view, an RFID transponder obtained by cutting the conductive sheet according to FIG. 5d.

FIG. 5e shows an RFID transponder 100 obtained after cutting the second groove C2.

FIGS. 6a-6f show manufacturing a transponder 100 such that the conductive sheet is held by tensioning forces FX1, FX2. Holding the sheet by tensioning forces may be advantageous e.g. high speed mass production.

Figure 6A:
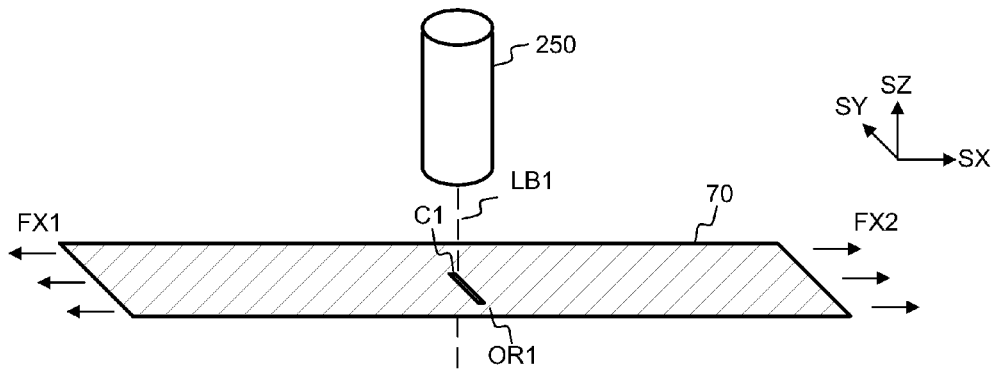
FIG. 6a shows, in a three dimensional view, cutting a preliminary groove in a conductive sheet.

FIG. 6a shows cutting the first groove C1. The sheet 70 may be held by tensioning forces FX1, FX2 during cutting the first groove C1. The surrounding portion OR1 increases the strength of the sheet and may help to maintain the dimensions of the groove C1 despite of the strain caused by the tensioning forces FX1, FX2.

Figure 6B:
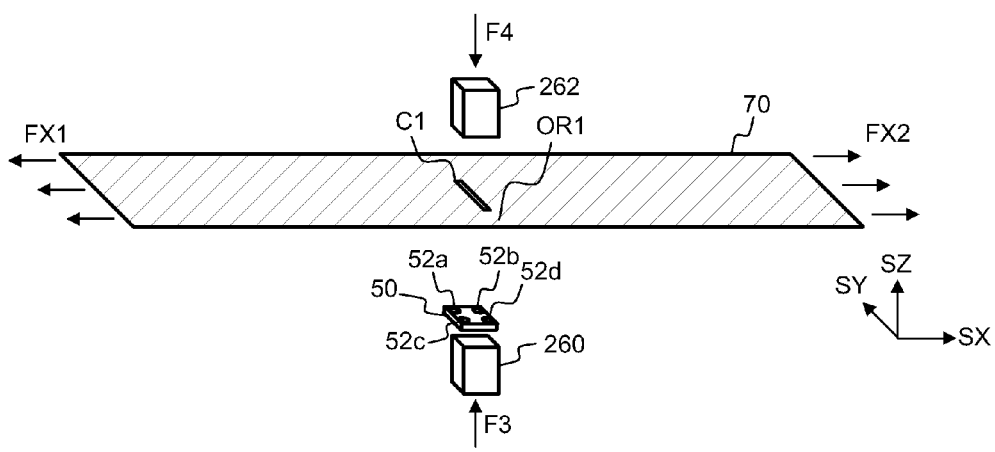
FIG. 6b shows attaching an RFID chip to the conductive sheet.

FIG. 6b shows attaching the chip 50 onto the conductive sheet 70 by using a compressing force F3 generated by a chip holder 260. A counter force F4 may be simultaneously generated by a backing support 262. The sheet 70 may be held in place by tensioning forces FX1, FX2 during attaching the chip 50.

Figure 6C:
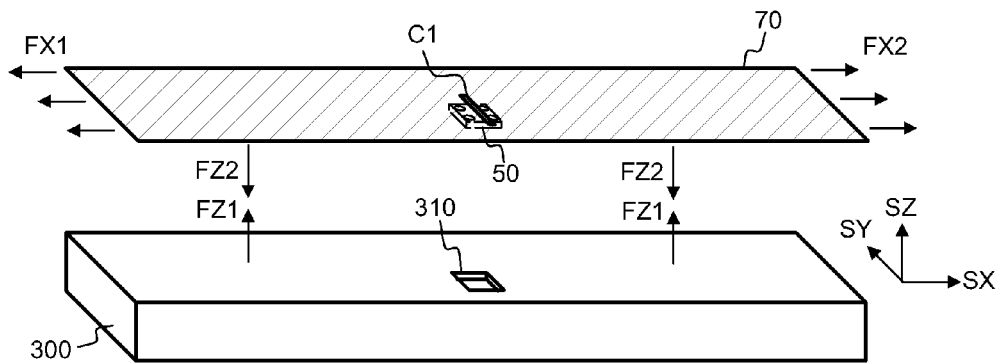
FIG. 6c shows, in a three dimensional view, supporting the conductive sheet by a sheet holder.

FIG. 6c shows supporting the sheet 70 may be holder 300. Advantageously, the sheet 70 may be compressed against the holder 300 by a holding force FZ2.

The holding force FZ2 may be generated e.g. by gravity, by a clamping surface (see FIG. 9b), by a pressure difference (see FIG. 8d), and/or by mechanically pulling the sheet 70 against a curved surface. The holding force FZ2 generated by gravity is small but may be sufficient to hold the sheet 70 in certain embodiments.

The surface of the holder 300 supports the sheet 70 with a supporting force FZ1, which is equal to the holding force FZ2 (but directed in the opposite direction)

The holder 300 may have a slot 310 to accommodate and/or support the chip 50 when the chip 50 is located between the conductive sheet 70 and the holder 300.

Figure 6D:
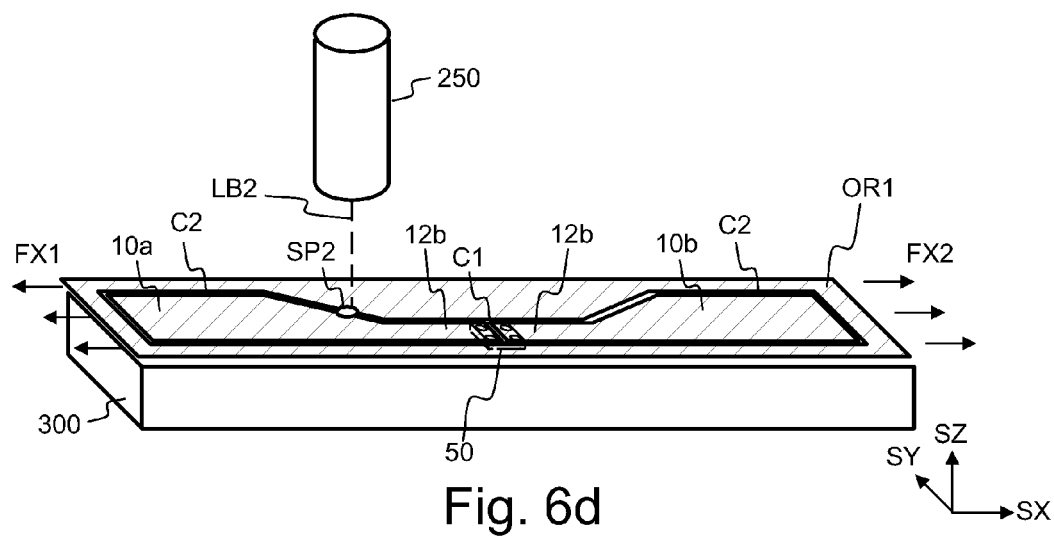
FIG. 6d shows, in a three dimensional view, cutting the conductive sheet by a laser beam after the RFID chip has been attached to the conductive sheet.

Referring to FIG. 6d, the second groove C2 may be cut with a laser beam LB2 after the chip 50 has been attached.

During cutting the groove C2, the outer portion OR1 may be kept in place by the holding force FZ2 and/or by the tensioning forces FX1, FX2.

Figure 18A:
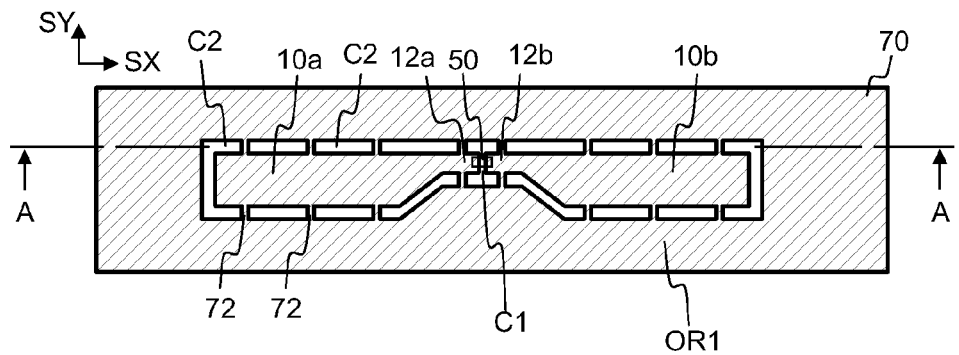
FIG. 18a shows, in a three dimensional view, antenna elements connected to an outer portion of the conductive sheet by a plurality of links.

A task associated with cutting an antenna element 10a from the conductive sheet 70 is also to maintain the correct position of the antenna element during the cutting. During cutting the groove C2, the antenna elements 10a, 10b may be kept in place e.g. by the holding force FZ2 (generated by gravity, pressure difference, pulling against curved surface, and/or clamp). Alternatively or in addition to the holding force FZ2, the antenna elements 10a, 10b may also be kept in place by a plurality of links 72 and/or bridge elements S1 (FIG. 18a, FIG. 19e).

The position of an antenna element may be monitored during cutting the shape of said antenna element. The position of the cutting laser beam LB2 may be adjusted based on the detected position of the antenna element. Consequently, small movements of the antenna element may be tolerated during the cutting.

Figure 6E:
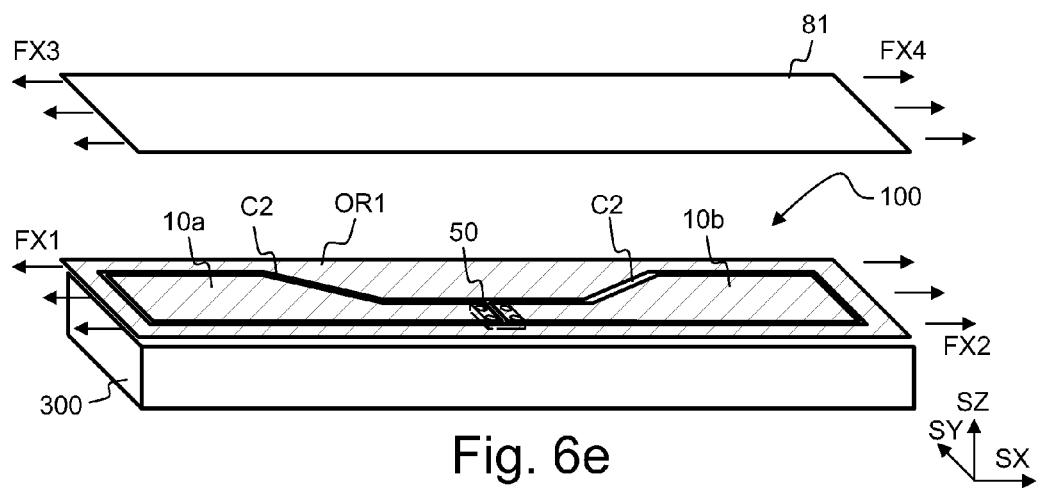
FIG. 6e shows, in a three dimensional view, an RFID transponder supported by a sheet holder, and a carrier sheet.

Referring to FIG. 6e, a carrier sheet 81 may be brought close to the transponder supported on the holder 300. The carrier sheet 81 may be held in the correct position e.g. by tensioning forces FX3, FX4.

At this stage, the transponder 100 may already be separate from the outer portion OR1. However, the transponder 100 may still be in the same plane with the outer portion OR1.

The transponder 100 may be moved away from the outer portion OR1 e.g. by a method comprising applying an adhesive selectively on the antenna elements 10a, 10b but not on the outer portion OR1. When the carrier sheet 81 is brought to contact with the transponder 100, the transponder 100 may be adhered to the carrier sheet 8, and the transponder 100 may be moved away from the outer portion OR1 together with the carrier sheet 81.

Alternatively or in addition, an adhesive may be applied selectively only on those parts of the carrier sheet 81 which will be in contact with the antenna elements 10a, 10b. Those parts of the carrier sheet 81, which coincide with the outer portion OR1 and with the groove C2 may be left without the adhesive.

The adhesive used for fixing the transponder 100 to the carrier sheet 81 may be e.g. a pressure-sensitive adhesive or a hot-melt adhesive.

Figure 6F:
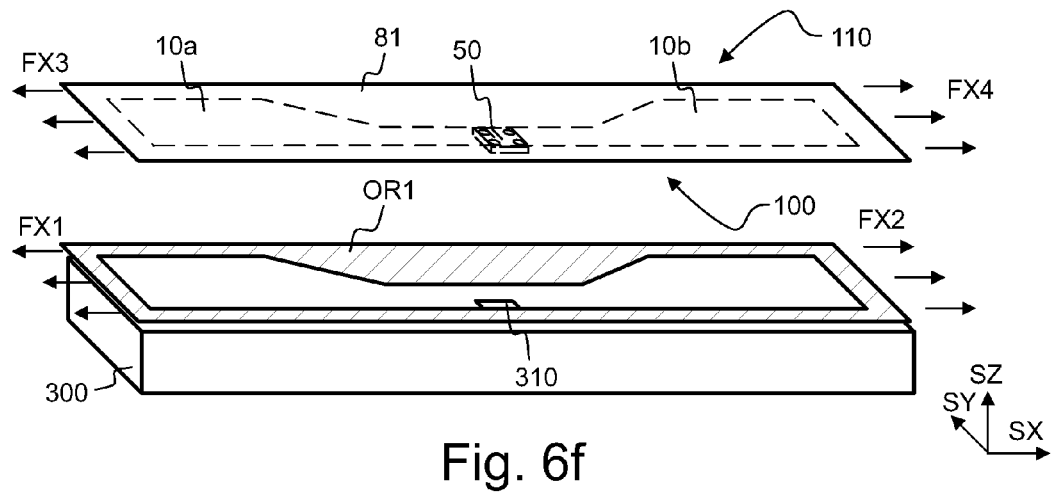
FIG. 6f shows, in a three dimensional view, an RFID transponder attached to the carrier sheet.

Referring to FIG. 6f, the transponder 100 may be moved away from the outer portion OR1 by using the carrier sheet 81 as a holding means. In particular, the transponder 100 may be displaced together with the carrier sheet 81 to a level which is different from the level of the outer region OR1. The carrier sheet 81 may be held and moved to the desired position e.g. by using tensioning forces FX3, FX4. Once the carrier sheet 81 has been adhered to the transponder 100, the carrier sheet 81 may stabilize the positions of the antenna elements 10a, 10b with respect to each other such that the transponder 100 withstands e.g. lifting and rapid movements.

The holder 300 may have a substantially planar form (as shown in the figures), or it may have a curved surface. In particular, the holder 300 may be a roll. In particular, the holder 300 may be rotating roll, wherein the conductive sheet 70 may be pulled against a curved surface of the holder 300 e.g. by tensioning forces FX1, FX2. The conductive sheet 70 may also be pressed against the holder 300 by one or more auxiliary (rotating) rolls or (sliding) pressing units.

Figure 7A:
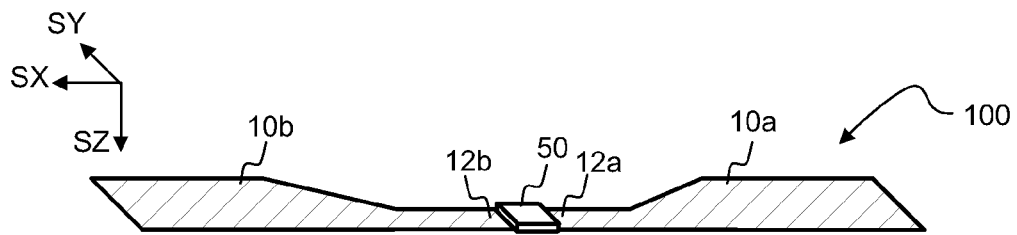
FIG. 7a shows, in a three dimensional view, a substrateless RFID transponder.

FIG. 7a shows a free-standing substrateless RFID transponder 100 comprising one or more antenna elements 10a, 10b and a chip 50.

A transponder 100 may be attached to a carrier sheet so as to provide an RFID tag.

Figure 21:
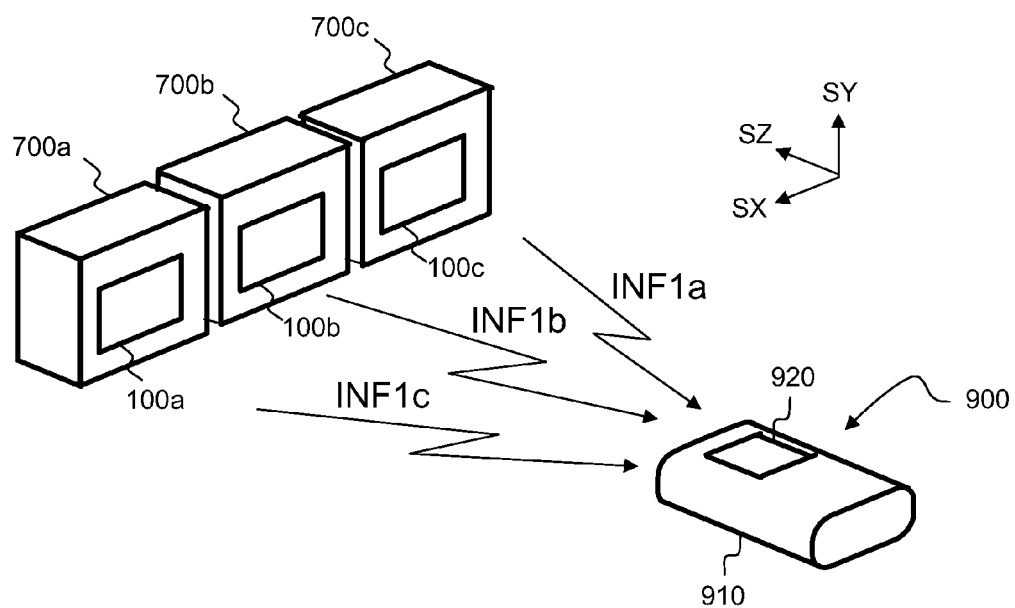
FIG. 21 shows, in a three dimensional view, RFID transponders attached to items.

Alternatively, the RFID transponder 100 may be directly attached to an item 700a (See FIG. 21). The item 700a may be e.g. a cardboard box or a battery for an electronic device. The RFID transponder 100 may be attached to a surface of the item 700a or the RFID transponder 100 may be embedded in the item 700a.

Figure 7B:
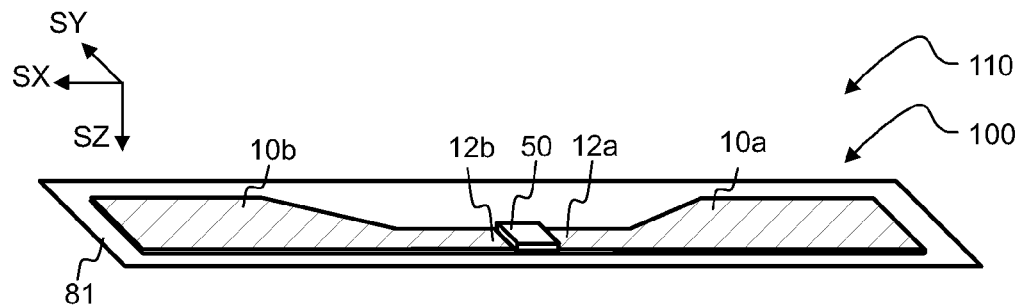
FIG. 7b shows, in a three dimensional view, an RFID transponder attached to a carrier sheet.

FIG. 7b shows a transponder 100 attached to a carrier sheet 81 so as to provide an RFID tag 110 or an RFID inlay 110. The terminal portions 12a, 12b of the antenna elements 10a, 10b may be located between the chip 50 and the carrier sheet 81.

Figure 7C:
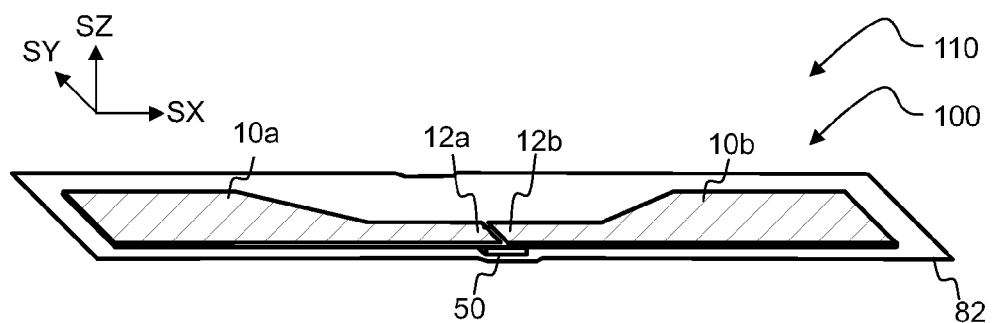
FIG. 7c shows, in a three dimensional view, an RFID transponder attached to a carrier sheet.

FIG. 7c shows a transponder 100 attached to a carrier sheet 82 so as to provide an RFID tag 110 or an RFID inlay 110. The chip 50 may be located between the terminal portions 12a, 12b and the carrier sheet 82.

Figure 7D:
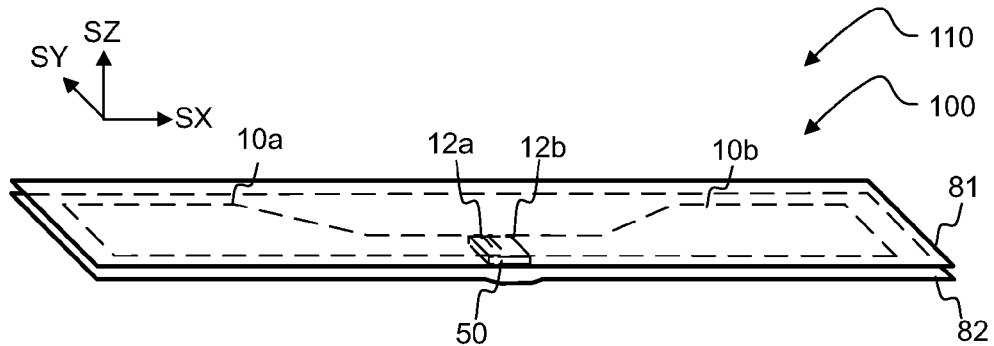
FIG. 7d shows, in a three dimensional view, an RFID transponder laminated between two sheets.

FIG. 7d shows a transponder 100 laminated between two sheets 81, 82 so as to provide an RFID tag.

The carrier sheet 81 and/or 82 may comprise e.g. plastic, paper or cardboard. The carrier sheet 81, 82 may be electrically insulating. The thickness of the sheet 81, 82 may be e.g. in the range of 0.03 to 1 mm. The carrier sheet 81 or 82 may optionally be lined with an adhesive layer. The adhesive layer may be optionally covered with a release layer.

FIGS. 8a-8e show manufacturing an RFID tag by using a pressure difference for holding the transponder and/or for holding the semi-manufactured transponder.

Figure 8A:
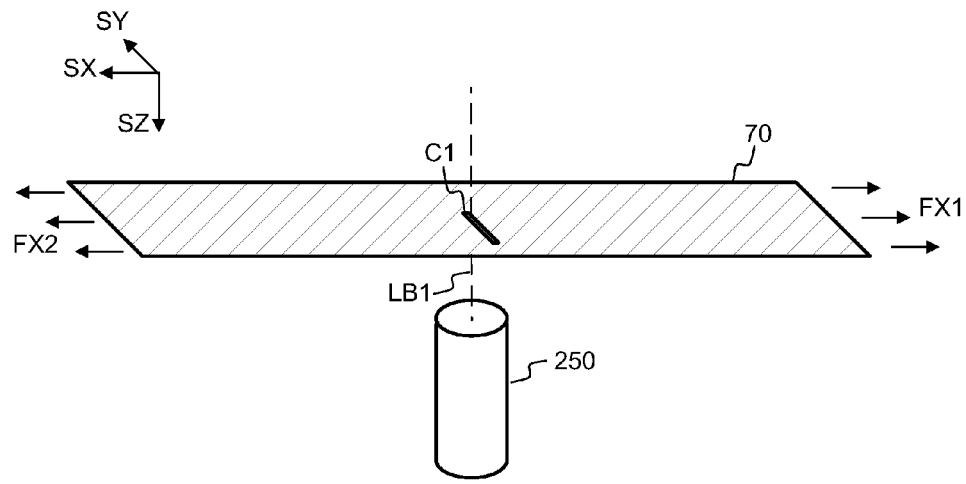
FIG. 8a shows, in a three dimensional view, cutting a preliminary groove in a conductive sheet.

FIG. 8a shows cutting the first groove C1.

Figure 8B:
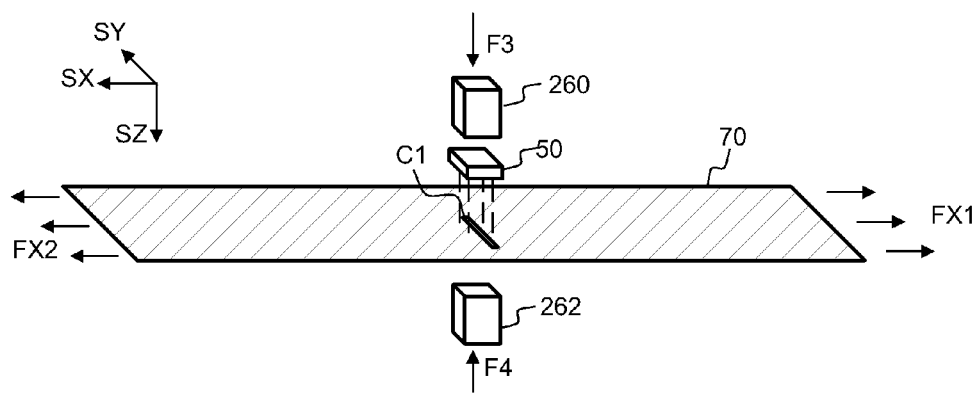
FIG. 8b shows, in a three dimensional view, attaching an RFID chip to the conductive sheet after the preliminary groove has been formed.

FIG. 8b shows attaching the chip 50 to the conductive sheet 70 by using a chip holder 260 and a backing support 262.

Figure 8C:
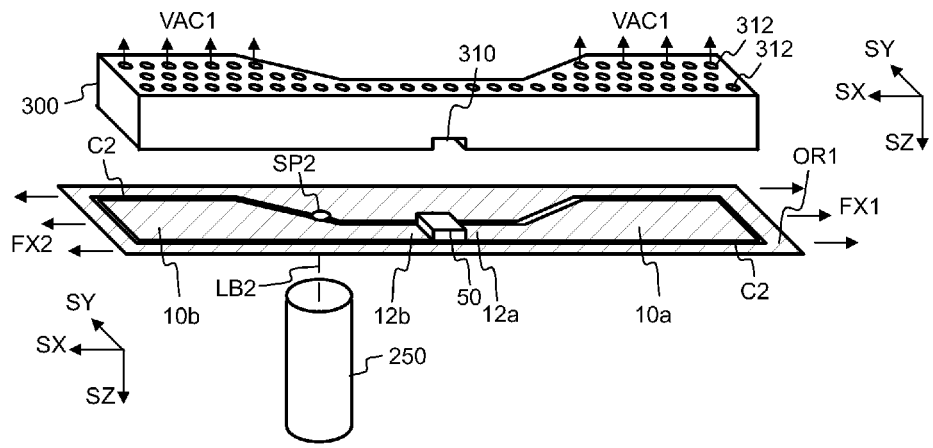
FIG. 8c shows, in a three dimensional view, a suction holder for holding the conductive sheet during cutting with a laser beam.

Referring to FIG. 8c, the combination of the chip and the conductive sheet 70 (i.e. a semi-manufactured transponder 100) may be supported by a holding member 300. The holding member 300 or holder 300 may comprise a plurality of holes 312 for pulling the conductive sheet 70 against the holder 300 by a pressure difference ("vacuum") VAC1. The holes 312 may be connected to a low-pressure unit (not shown). The gas pressure difference VAC1 ("vacuum") created by the holes 312 may fasten the antenna elements 10a, 10b firmly against the surface of the holding member 300.

The low pressure unit may be a pump (not shown). In particular, the low pressure unit may comprise a suction pump and a vacuum tank to provide a substantially constant low pressure, and one or more valves for switching the low pressure (vacuum) in the holes 312 on and off.

A substantially continuous groove C2 may be cut around the combination of the antenna elements 10a, 10b and the chip (i.e. around the RFID transponder 100). The antenna elements may be held securely in position when the (final) shape of the antenna elements 10a, 10b is cut by using the laser beam LB2 provided by the laser 250. The conductive sheet 70 may be held by the holder 300 during cutting the groove C2.

The transponder 100 may be moved away from the outer portion OR1 by holding the transponder 100 against the holder 300 by the pressure difference VAC1. The RFID transponder 100 may now be lifted (moved) away from the outer portion of the conductive sheet 70 by using the holding member 300.

When the transponder 100 is lifted away from the outer portion OR1, the outer portion OR1 of the conductive sheet 70 may be held e.g. by tensioning forces F1, F2. In particular, the conductive sheet 70 may be pulled against a slightly curved surface (not shown) in order to hold the outer portion OR1.

Alternatively or in addition to using the tensioning forces, also the outer portion OR1 may be held by a pressure difference. When the transponder 100 is lifted away from the outer surface OR1, a first pressure difference VAC1 may be arranged to pull the transponder in a first direction SZ and a second pressure difference may be arranged to pull the outer portion OR1 in the opposite direction -SZ.

The holding member 300 may have a curved holding surface. In particular, the holding member 300 may be a roll, which comprises a plurality of holes 312 connected to a low-pressure unit. The sheet 70 may be held against the surface of the roll by pressure difference VAC1. The roll may be called e.g. as a "vacuum roll" or a "suction roll". In particular, the roll-shaped holding member 300 may be used in roll-to-roll processing.

The holding member 300 may comprise a slot 310 or surface for holding the chip 50 securely in place. Thus, the holding member 300 may perform the function of the member 260.

The holding member 300 may be dimensioned such that the outer portion OR1 is not subjected to the suction force caused by the pressure difference. In particular, the contour of the holding member 300 may substantially match with the contour of the transponder 100. This may facilitate lifting the transponder away from the outer region OR1. During the lifting, the outer portion OR1 may be held by the tensioning forces and/or by the second pressure difference. Also the risk of damaging the holding member 300 with the cutting laser beam LB2 may be reduced when the outer portion OR1 does not overlap the location of the groove C2. However, selecting or fabricating a holding member 300 according to the shape of the transponder may complicate the manufacturing process.

In an embodiment, the same holding member 300 may be used for manufacturing transponders having various different sizes and shapes. The holding member 300 may have e.g. a substantially rectangular shape. The holding member 300 may at least partly overlap the outer region OR1. The outer portion OR1 may be held e.g. by tensioning forces FX1, FX2 and/or by using clamping members (FIG. 9b). If the holding member 300 overlaps the groove C2, there may be a risk of damaging the holding member 300 with the cutting laser beam LB2.

Figure 8D:
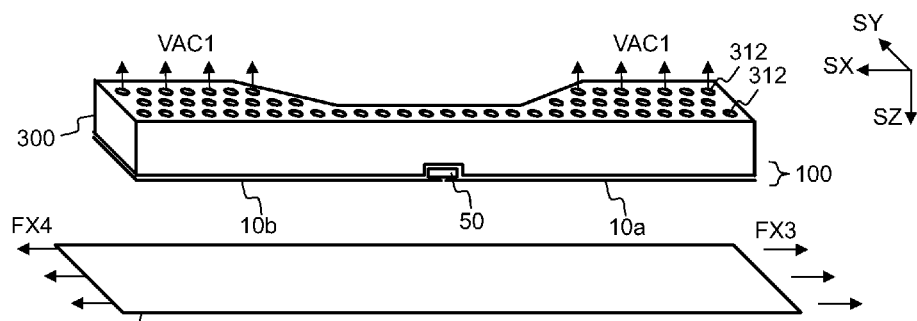
FIG. 8d shows, in a three dimensional view, holding an RFID transponder by a suction holder.

Referring to FIG. 8d, the transponder 100 may be subsequently brought into contact with a carrier sheet 81 by holding (in particular by moving) the transponder 100 with the holder 300. The transponder 100 may be subsequently positioned on a carrier sheet 81.

The transponder 100 may attached to the carrier sheet 81 by an adhesive.

The transponder 100 may be laminated between two sheets 81, 82 (FIG. 7d).

The adhesive may be applied selectively only to those portions of the carrier sheet 81, which will be in contact with the transponder. The adhesive may be applied to those portions of the transponder 100, which will be in contact with the carrier sheet. The conductive film may be covered with the adhesive even before the shape of the antenna elements is cut. Consequently, the upper side of the tag 110 formed after combining the transponder 100 with the carrier sheet 81 may remain substantially free of adhesive. Thus, the tag 110 may be easier to handle because it is not tacky.

Alternatively, the whole (one-sided) area of the carrier sheet 81 may be covered with an adhesive prior to attaching the transponder 100 onto the carrier sheet 81. Those (upper side) portions of the tag which are not covered by the transponder may remain tacky. The tacky adhesive-lined surface may be subsequently used for attaching the tag to an item 700a (FIG. 21). The tacky surface may be lined with a release layer to facilitate transportation and storage. The tacky adhesive-lined surface may be used for attaching the combination of the transponder and the carrier sheet 81 to a second carrier sheet 82.

Removal of the transponder 100 from the holding member 300 may be assisted by springs and/or by temporarily blowing gas through the holes 312 towards the transponder 100.

Figure 8E:
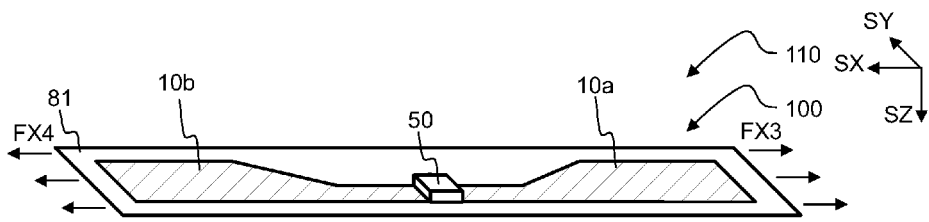
FIG. 8e shows, in a three dimensional view, an RFID transponder attached to a carrier sheet.

FIG. 8e shows an RFID tag obtained after the transponder 100 has been attached to the carrier sheet 81.

Figure 9A:
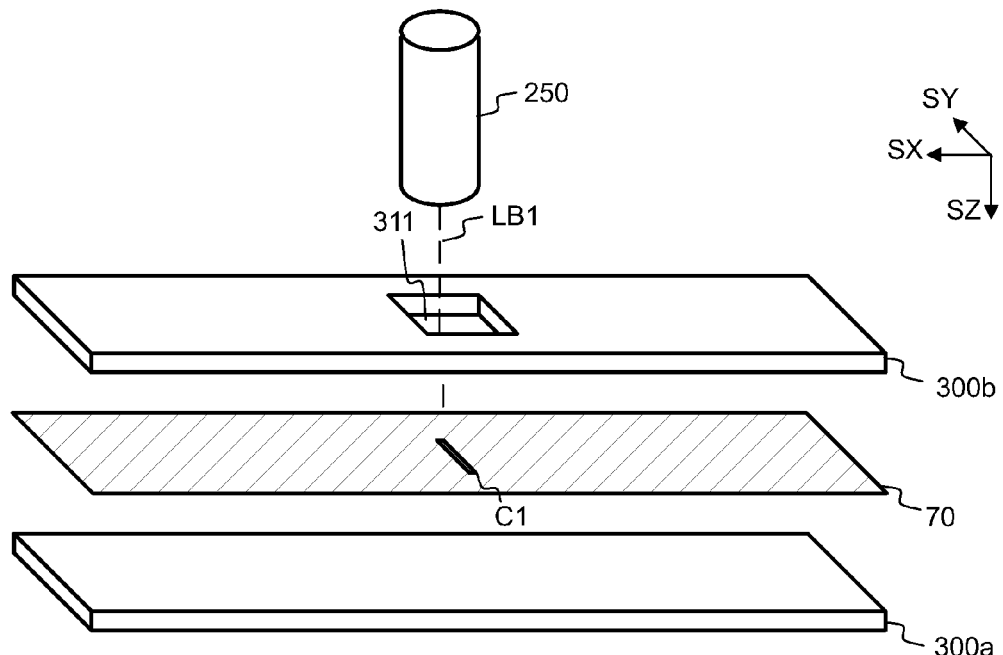
FIG. 9a shows, in a three dimensional view, holding the conductive sheet by clamping members during cutting the preliminary groove.
Figure 9B:
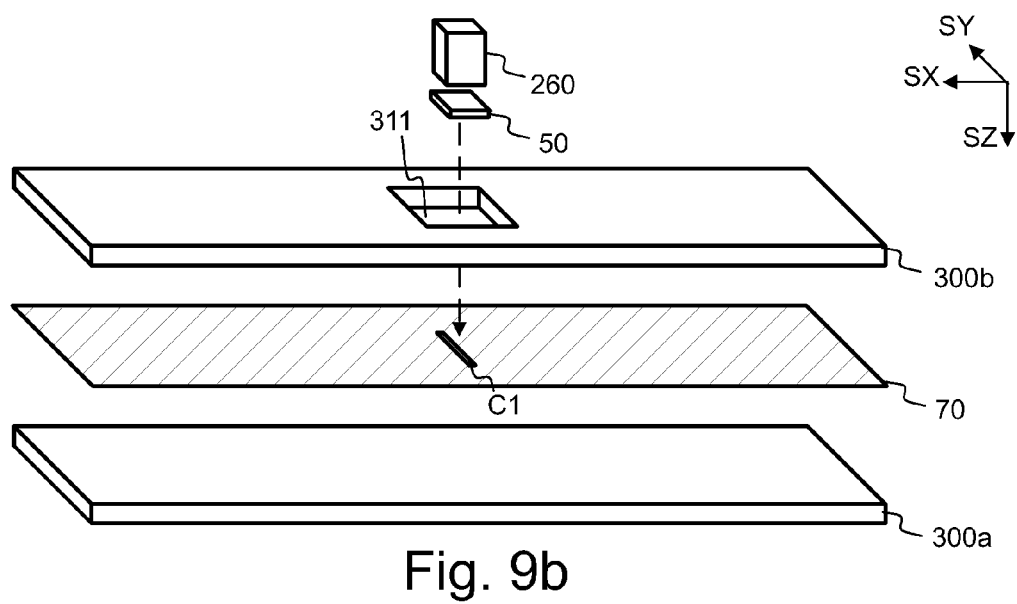
FIG. 9b shows, in a three dimensional view, holding the conductive sheet by clamping members during attaching an RFID chip to the conductive sheet.

Referring to FIG. 9a, the conductive sheet 70 may be held during cutting the first groove C1 by clamping the sheet 70 between a first clamping member 300a and a second clamping member 300b. At least the second clamping member 300b may have an opening 311 to provide an unobstructed space for a cutting laser beam LB1.

Instead of using a planar member 300a, the member 300a may have a curved holding surface. The first clamping member 300 and/or the second clamping member 300b may be rolls.

Referring to FIG. 9b, the conductive sheet 70 may be held by the clamping members 300a, 300b during attaching the chip 50 onto the sheet 70.

Holding the conductive sheet 70 by clamping may provide accurate positioning of chip 50 with respect to the first groove C1, thanks to the outer portion OR1, which stabilizes the dimensions of the groove C1.

The conductive sheet 70 may be held by the clamping members 300a, 300b during cutting the second groove C2 (not shown). The holding member 300b may comprise one or more slots 311 to provide an unobstructed space for a cutting laser beam LB2.

The second holding member 300b may comprise one or more (rotating) rolls (not shown) which press the sheet 70 against the first holding member 300b. The one or more rolls may be arranged to move according to the position of the cutting laser beam LB2 so as to provide an unobstructed space for the beam LB2. The rolls may be arranged to move in synchronization with the position of the beam LB2. In particular, the second holding member 300b may comprise one or more (rotating) rolls (not shown) which press the sheet 70 against the first holding member 300a. The conductive sheet 70 may be moved during cutting the second groove C2 by moving (e.g. rotating) the first clamping member 300a. A cutting laser beam LB2 may be moved during cutting the second groove C2 such that it does not impinge on the rolls of the second holding member 300b.

The accuracy of holding the antenna elements in the correct position may be (gradually) degraded during cutting the second groove C2, because the outer portion OR1 ceases to stabilize the position of the antenna elements. The portions of the antenna elements close to the chip 50 (in particular the terminal portions 12a, 12b) may be cut before cutting the other portions of the antenna elements farther away from the chip 50, in order to cut the terminal portions with a high accuracy.

Figure 10:
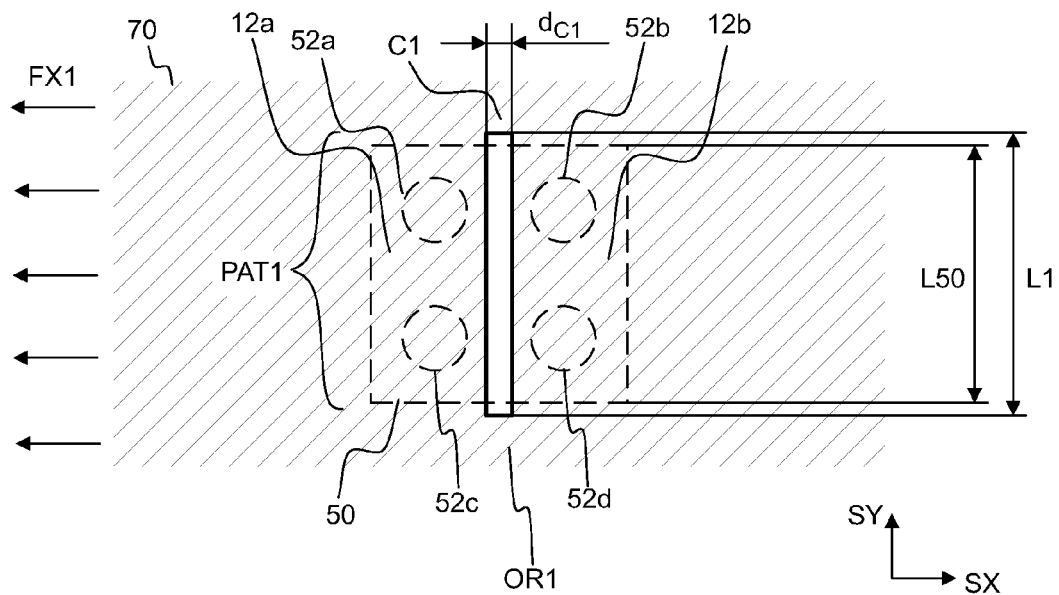
FIG. 10 shows, in a top view, dimensions of a preliminary groove.

FIG. 10 shows a preliminary groove C1 cut in a conductive sheet 70. $d_{C1}$ denotes the width of the groove C1, L1 denotes the length of the groove C1, and L50 denotes of the RFID chip 50. The RFID chip 50 may have two or more connecting elements 52a, 52b, 52c, 52d. The connecting elements 52a, 52b, 52c, 52d may be bonded to two or more terminal portions 12a, 12b.

A preliminary pattern PAT1 may consist of grooves C1 formed before the chip 50 is attached to the conductive sheet 70.

The width $d_{C1}$ may be e.g. in the range of 0.1 mm to 1 mm. The width $d_{C1}$ may be e.g. greater than or equal to the thickness d0 of the conductive sheet 70 (the thickness d0 is shown FIG. 18b).

The length (dimension) L1 of the groove C1 in the direction SX may be greater than or equal to the length (dimension) L50 of the chip 50 in the direction SX in order to avoid damaging the chip 50 during cutting the second groove C2 with the laser beam LB2. Advantageously, the length (dimension) L1 of the groove C1 is (slightly) greater than the length L50 of the chip 50 in order to allow errors in the positioning of the chip 50 with respect to the groove C1. The length (dimension) L1 may be e.g. greater than or equal to $L50+2 \cdot_{C1}$.

The outer portion OR1 surrounds the preliminary pattern PAT1 and stabilizes the width $d_{C_1}$ during handling of the semi-manufactured transponder 100. In particular, the outer portion OR1 surrounds the groove C1.

Figure 11:
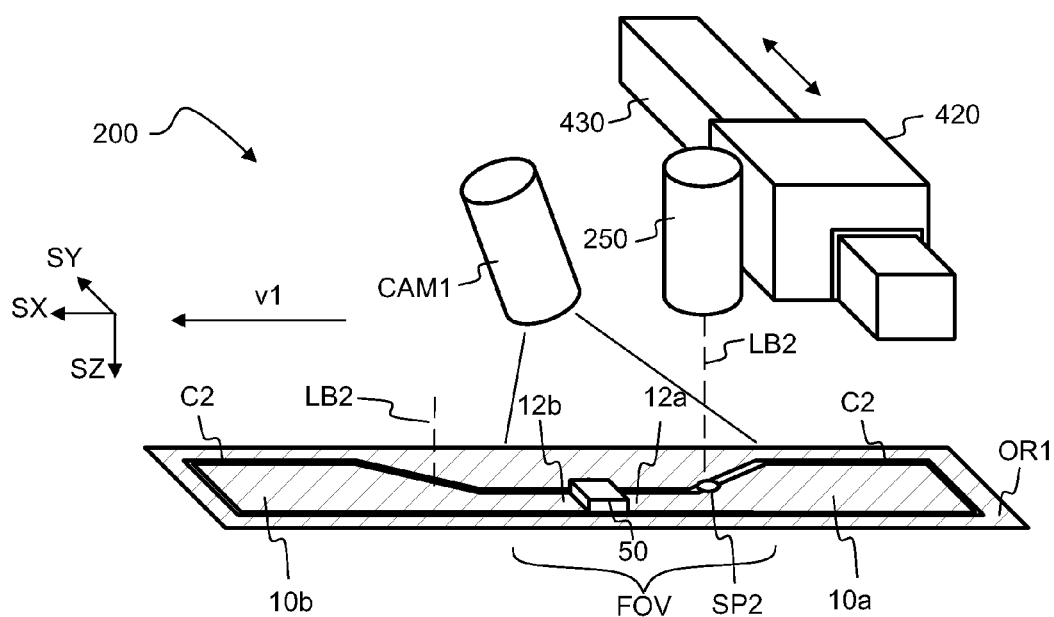
FIG. 11 shows, in a three dimensional view, a laser cutting apparatus.

Referring to FIG. 11, the position of the preliminary groove C1, the position of the chip 50 and/or the position of the cutting laser beam LB2 may be monitored by using a monitoring unit CAM1.

The manufacturing apparatus 200 may optionally comprise a monitoring unit CAM1 to detect the position of the chip with respect to the position of the preliminary groove C1. The monitoring unit CAM1 may be e.g. a camera, which has a field of view FOV.

During cutting the second groove C2, the spot SP2 of the laser beam LB2 may be moved with respect to the conductive sheet 70 e.g. by a beam steering unit.

For example, the beam steering unit may comprise a translation stage. A laser 250 may be attached to a translation unit 420, which may be arranged to move along a guide 430 in the direction SY. The beam steering unit may also comprise a second translation stage for moving the laser 250 in the direction SX. However, the second translation stage may be omitted if the conductive sheet 70 is moved in the direction SX e.g. by a pair of rollers (See FIG. 11*a*). The conductive sheet may be moved e.g. at a velocity v1 with respect to the laser spot SP2.

The beam steering unit may comprise e.g. one or more movable mirrors, prisms, lenses, diffractive elements and/or masks for changing the position of the laser spot SP2 on the conductive sheet 70. In other words, it is not necessary to move the laser 250.

The beam LB2 may be stationary and the sheet 70 may be moved. Both the beam and the sheet may be moved.

Several laser beams may be used for cutting several grooves substantially simultaneously.

The conductive sheet 70 may be moved with respect to the laser beam LB1.

The apparatus may comprise a monitoring unit 410 for monitoring the laser cutting process. The monitoring unit 410 may comprise e.g. a digital camera and/or a pyrometer.

The monitoring unit 410 may be arranged to determine the position of the spot of the laser beam LB2 with respect to the conductive sheet 70. The monitoring unit 410 may be arranged to determine the position of the chip 50 attached to the conductive sheet 70. The monitoring unit 410 may be arranged to monitor the temperatures of the materials heated by the laser beam. The monitoring unit 410 may be arranged to monitor depth of slots or grooves cut on the conductive sheet 70.

Information provided by the monitoring unit 410 may be used for controlling the position, power and/or scanning speed of the laser beam LB2. Scanning speed means the relative velocity of the spot SP2 of the laser beam LB2 with respect to the conductive sheet 70.

The monitoring unit 410 may have a field of view FOV.

Figure 12:
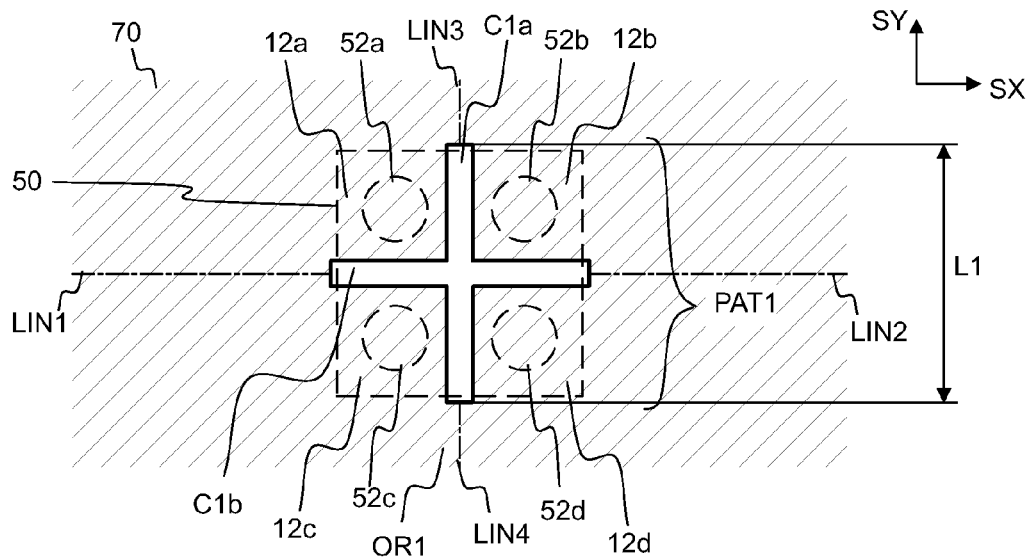
FIG. 12 shows, in a top view, a cross-shaped preliminary pattern consisting of preliminary grooves.

Referring to FIG. 12, a preliminary pattern PAT1 may be formed in the conductive sheet prior to attaching the chip 50. The preliminary pattern may be e.g. a cross consisting of two intersecting grooves C1a, C1b. The surrounding outer portion OR1 may stabilize the dimensions of the preliminary pattern during cutting the preliminary grooves C1a, C1b and during attaching the chip 50.

After the cross-shaped preliminary pattern PAT1 has been formed, the chip 50 may be attached to the conductive sheet 70. After the chip 50 has been attached, a second set of grooves C2 may be cut in the sheet 760 along lines LIN1, LIN2, LIN3, LIN4. The arms of the cross-shaped preliminary pattern PAT1 may define four terminal portions 12*a*, 12*b*, 12*c*, 12*d* together with said second grooves C2.

Figure 13:
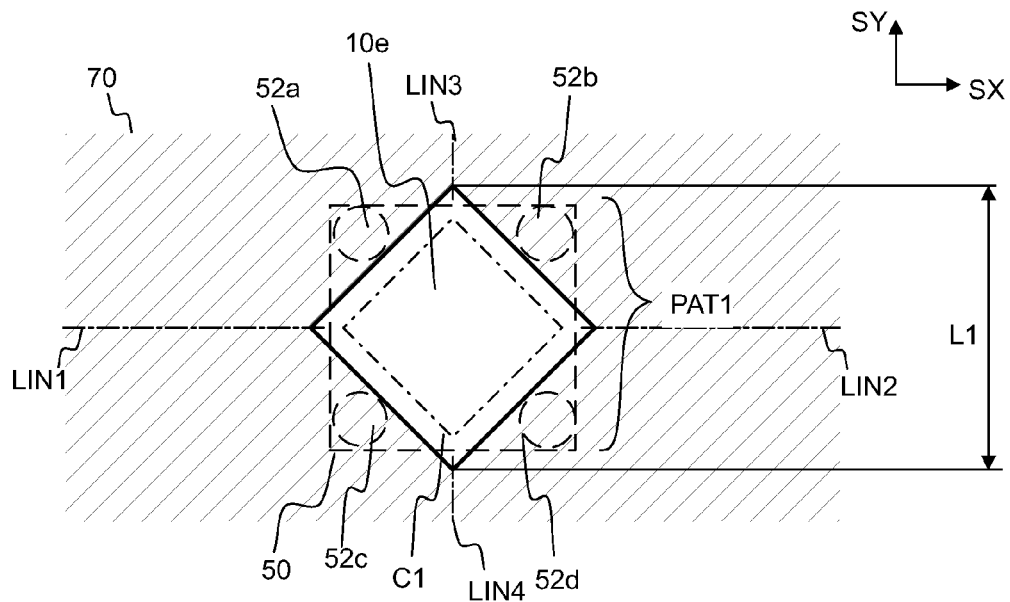
FIG. 13 shows, in a top view, a rectangular preliminary pattern formed by preliminary grooves.

FIG. 13 shows a substantially rectangular preliminary pattern PAT1. The pattern PAT1 may be formed e.g. by making a rectangular groove C1. A residual portion 10*e* of the conductive sheet in the middle of the pattern PAT1 is preferably removed prior to attaching the chip 50 to the sheet 70.

After the chip 50 has been attached, a second set of grooves C2 may be cut in the sheet 760 along lines LIN1, LIN2, LIN3, LIN4. The rectangular preliminary groove C1 may define four terminal portions 12*a*, 12*b*, 12*c*, 12*d* together with the second set of grooves C2.

Figure 14A:
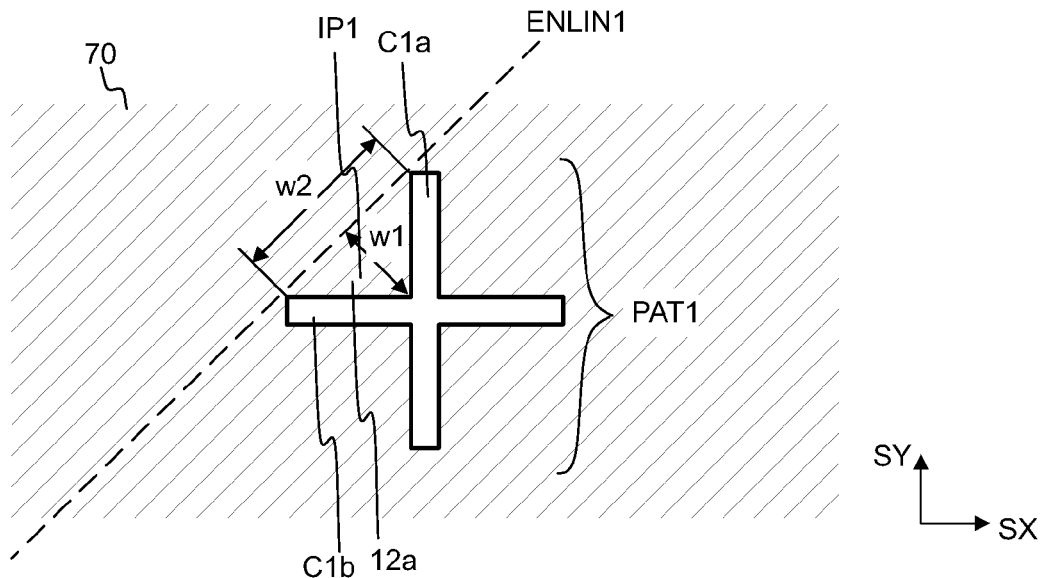
FIG. 14a shows, in a top view, dimensions of an inward protrusion defined by a preliminary pattern.
Figure 14B:
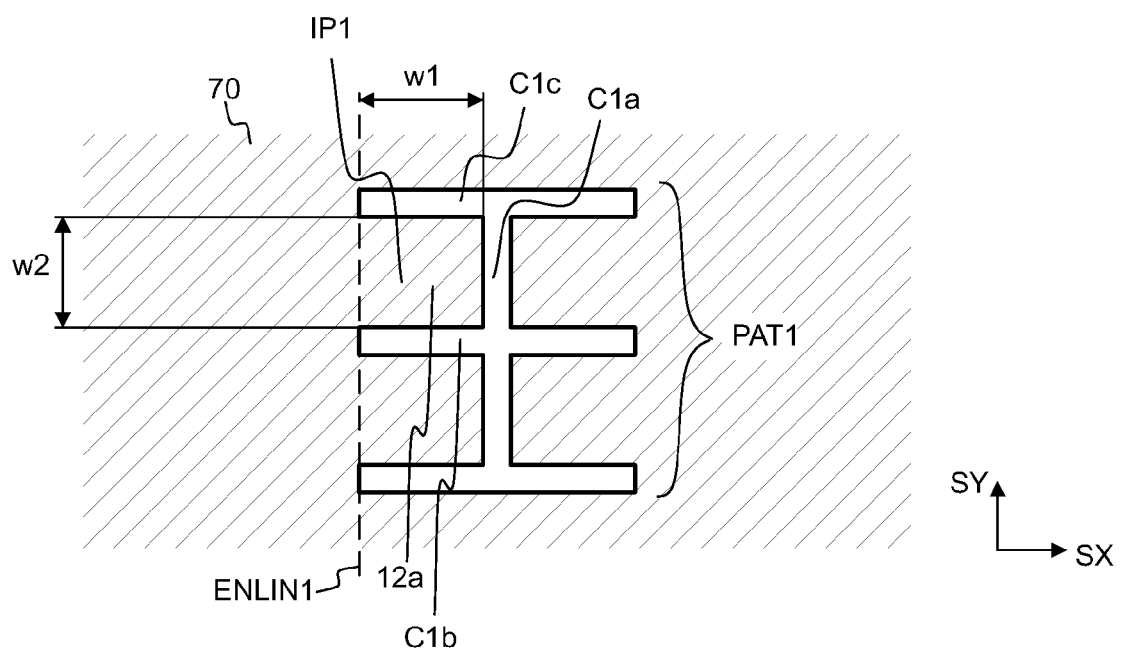
FIG. 14b shows, in a top view, dimensions of an inward protrusion defined by a preliminary pattern.

Referring to FIGS. 14*a* and 14*b*, a preliminary pattern PAT1 may define an internal protrusion IP1. The protrusion IP1 may also be called as an inward protrusion. The internal protrusion IP1 may have a width w2 and a protruding dimension w1. The dimension w1 may also be called as the length of the inner protrusion IP1.

In FIG. 14*a*, a protrusion IP1 may be defined by two grooves C1a, C1b. In FIG. 14*b*, a protrusion IP1 may be defined by three grooves C1a, C1b, C1c.

The ends of the arms of the preliminary pattern PAT1 may define a line ENLIN1. The protruding length w1 may mean the maximum distance from the line ENLIN1 to the farthermost point of the protrusion IP1. In order to ensure sufficient dimensional stability, the ratio of the width w2 of the protrusion IP1 to the length w1 of the protrusion IP1 may be e.g. greater than or equal to 0.8. Advantageously, the ratio of the width w2 of the protrusion IP1 to the length w1 of the protrusion IP1 is greater than or equal to 1.4. In case of the cross pattern PAT1 shown in FIG. 14*a*, the ratio w2/w1 is equal to $\sqrt{2}$.

Maximum dimensional stability may be provided when the preliminary pattern PAT1 does not define any internal protrusions IP1, i.e. when the length w1 of the protrusion IP1 is zero. For example, the single straight groove C1 of FIG. 10 and the rectangular pattern PAT1 of FIG. 13 do not define an internal protrusions.

Figure 14C:
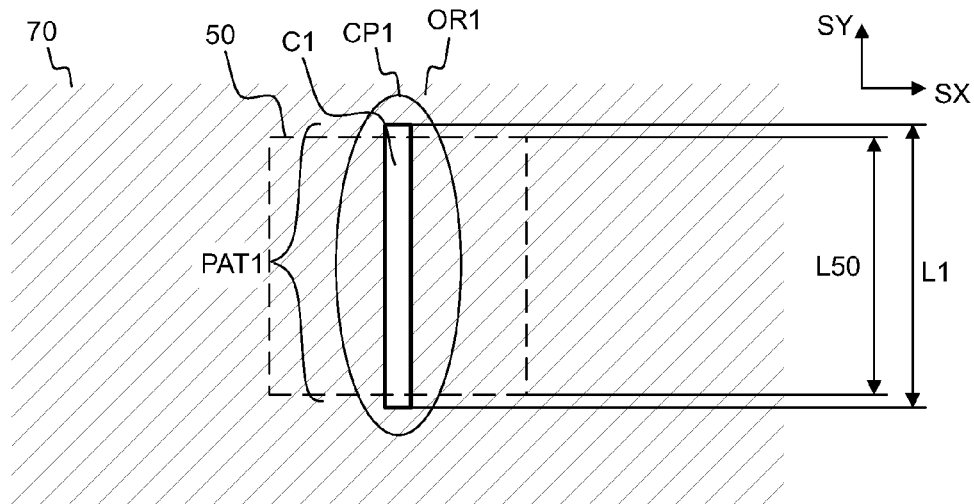
FIG. 14c shows, in a top view, a closed path surrounding a preliminary pattern.
Figure 14D:
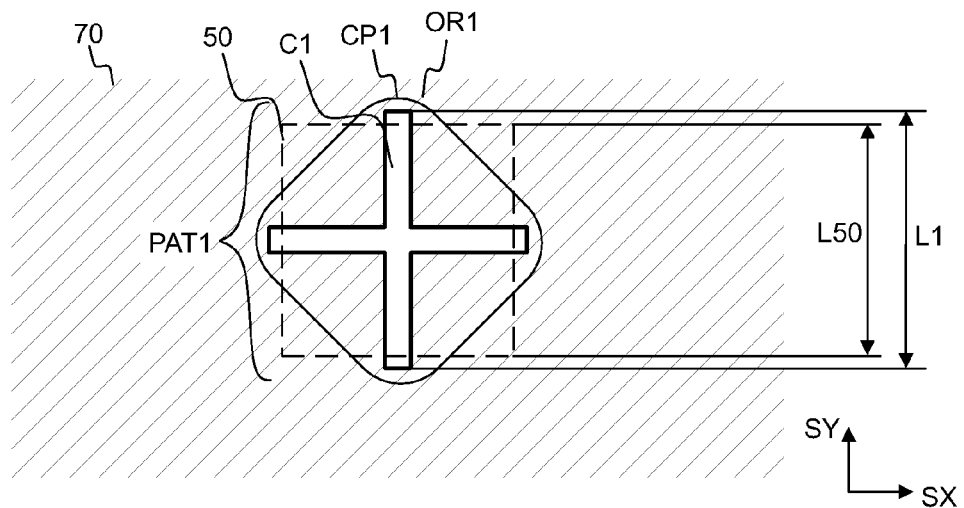
FIG. 14d shows, in a top view, a closed path surrounding a preliminary pattern.

Referring to FIGS. 14*c* and 14*d*, the outer portion OR1 completely surrounds the preliminary groove C1. The groove C1 should not be too long when compared with the dimensions of the chip 50, because this would reduce the dimensional stability (i.e. rigidity) of the conductive sheet during attaching the chip 50.

A closed path CP1 may surround (i.e. enclose) the groove C1 such that each point of the closed path CP1 is located on the conductive material of the conductive sheet 70.

Said closed path CP1 may also surround (i.e. enclose) a preliminary pattern PAT1 comprising two or more preliminary grooves C1.

Said closed path CP1 may also surround (i.e. enclose) a preliminary pattern PAT1 consisting of two or more adjoining preliminary grooves C1.

Figure 17A:
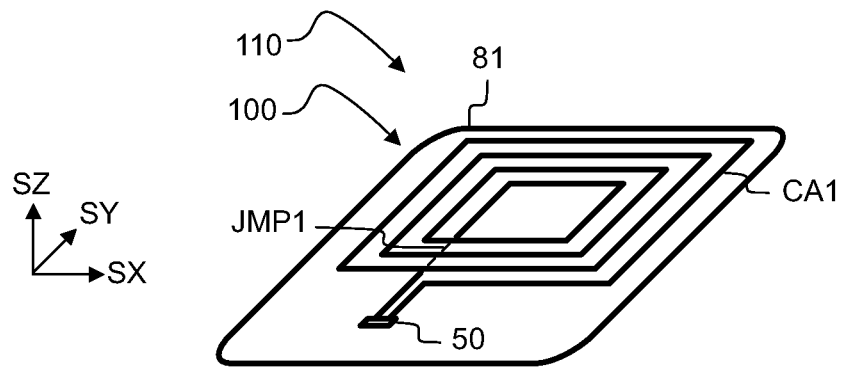
FIG. 17a shows, in a three dimensional view, an RFID transponder having a coil antenna.
Figure 17B:
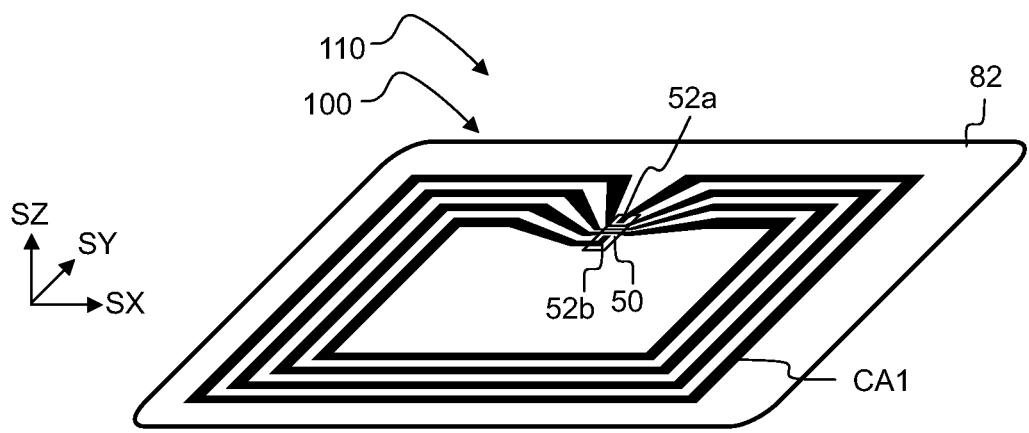
FIG. 17b shows, in a three dimensional view, an RFID transponder having a coil antenna implemented without a jump wire.
Figure 17C:
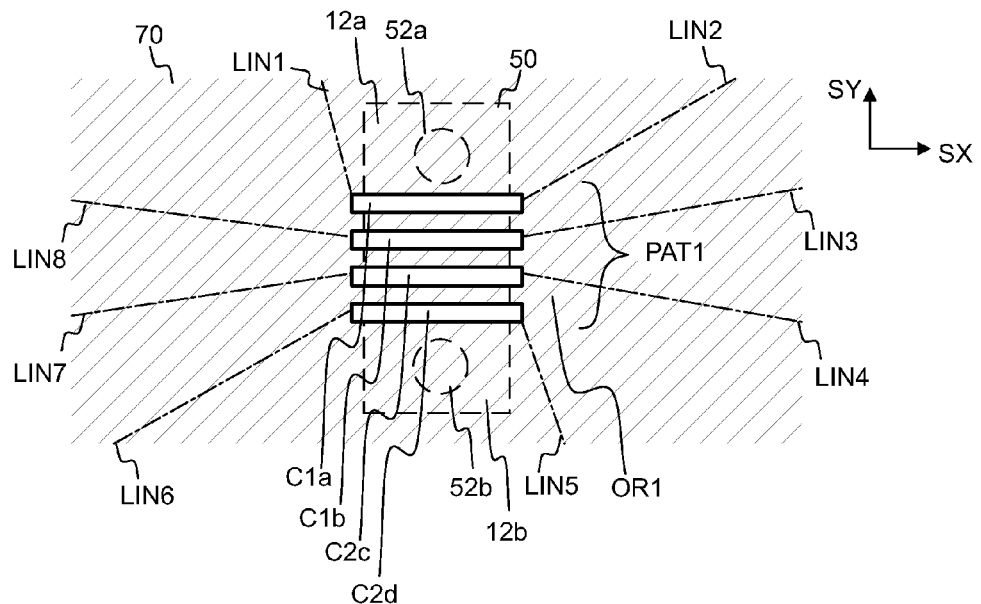
FIG. 17c shows, in a three dimensional view, preliminary grooves for producing a coil antenna.

Said closed path CP1 may also surround (i.e. enclose) a preliminary pattern PAT1 comprising two or more separate preliminary grooves C1, which are not connected to each other (see e.g. FIG. 17*c*).

The length $L_{CP1}$ of the closed path CP1 may be e.g. smaller than or equal to ten times the circumference $L_{CF}$ of the chip 50. The length $L_{CP1}$ of the closed path CP1 may be e.g. smaller than or equal to five times the circumference $L_{CF}$ of the chip 50. The length $L_{CP1}$ of the closed path CP1 may be e.g. smaller than or equal to three times the circumference $L_{CF}$ of the chip 50. Advantageously, the length $L_{CP1}$ of the closed path CP1 is smaller than or equal to two times the circumference $L_{CF}$ of the chip 50. Preferably, the length $L_{CP1}$ of the closed path CP1 is smaller than or equal to the circumference $L_{CF}$ of the chip 50.

When the preliminary pattern PAT1 consists of a single groove C1 the minimum length $L_{CP1}$ of the closed path CP1 may be greater than two times the dimension L50. In case of a chip 50 having a substantially square shape, this means that the minimum length $L_{CP1}$ may be e.g. greater than 50% of the circumference $L_{CF}$.

When the preliminary pattern PAT1 is a cross consisting of two substantially perpendicular grooves having equal lengths, the minimum length $L_{CP1}$ may be greater than the dimension L50 multiplied by a number $2\sqrt{2}$. In case of a chip 50 having a substantially square shape, this means that the minimum length $L_{CP1}$ may be greater than the circumference $L_{CF}$ divided by the number $\sqrt{2}$.

Figure 14E:
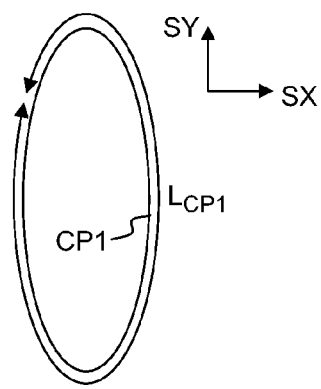
FIG. 14e shows, in a top view, the length of a closed path.
Figure 14F:
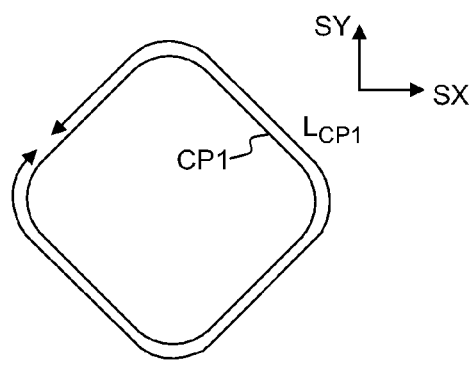
FIG. 14f shows, in a top view, the length of a closed path.

The length $L_{CP1}$ of the closed path CP1 is shown in FIGS. 14e and 14f. The closed path CP1 may also called as a loop CP1. The length $L_{CP1}$ of the path may also be called as the circumference $L_{CP1}$ of the loop CP1. For example, in case of a circular path CP1, the length $L_{CP1}$ of the path CP1 is equal to the diameter of the path multiplied by $\pi$. For example, in case of the substantially rectangular path CP1 shown in FIG. 14d, the minimum length $L_{CP1}$ of the closed path CP1 must be greater than $2\sqrt{2} \cdot L1$.

The closed path CP1 may enclose an area, which is smaller than or equal to e.g. 10% of the (one-sided) surface area of the (finished) transponder 100, preferably smaller than or equal to 2% of the (one-sided) surface area of the (finished) transponder 100. For example, a dimension of a substantially rectangular transponder 100 in the direction SX may be 100 mm, a dimension of the transponder 100 in the direction SX may be 10 mm, the area of the transponder 100 may be approximately 1000 mm², and the area enclosed by the closed path CP1 may be e.g. smaller than or equal to 20 mm². In this example, the area of the chip 50 may be e.g. 2 mm².

Figure 14G:
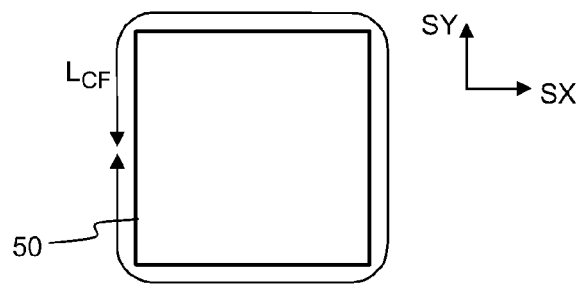
FIG. 14g shows, in a top view, the circumference of an RFID chip.

The circumference $L_{CF}$ of the chip 50 is shown in FIG. 14g. The circumference $L_{CF}$ of the chip 50 may also be called as the perimeter. The length $L_{CP1}$ is measured in the plane of the conductive sheet 70, i.e. in the plane defined by the directions SX and SY. Also the circumference $L_{CF}$ is measured in the plane of the conductive sheet 70, i.e. in the plane defined by the directions SX and SY.

Figure 14H:
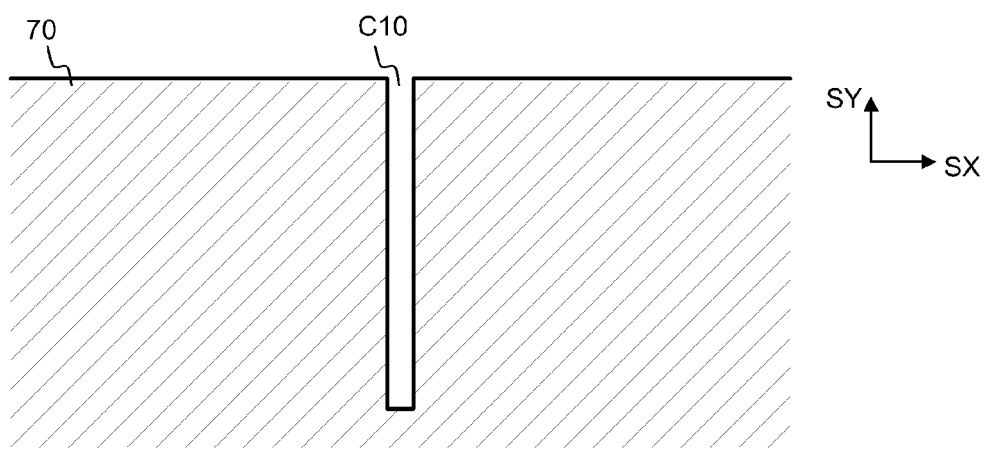
FIG. 14h shows, in a top view, a groove extending to an edge of the conductive sheet.

As a comparative example, FIG. 14h shows a groove C10, which extends to an edge of the conductive sheet 70. The groove C10 of FIG. 14h cannot be surrounded by a closed path CP1 such that each point of the closed path CP1 is located on the conductive material of the conductive sheet 70.

Figure 14I:
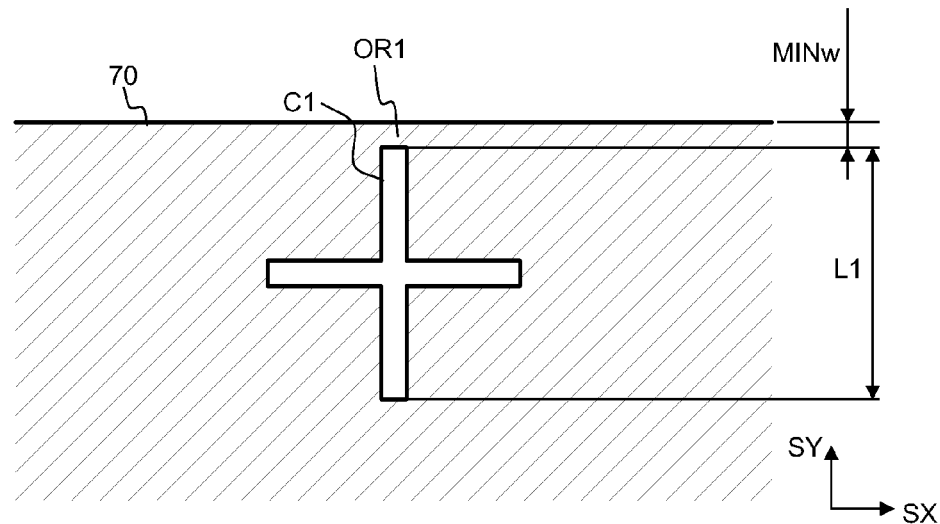
FIG. 14i shows, in a top view, a preliminary pattern positioned close to an edge of the conductive sheet.

Referring to FIG. 14i, the preliminary pattern PAT1 should not be too close to an edge of the conductive sheet 70. The minimum distance MINw between the preliminary pattern PAT1 and the edge of the sheet 70 may be e.g. greater than or equal to five times the thickness d0 of the sheet 70. Otherwise the dimension MINw of the surrounding portion OR1 may be too small to provide the required strength and dimensional stability. If the dimension MINw is two small, the outer portion OR1 may be broken due to strain caused by tensioning forces FX1, FX2.

Figure 15:
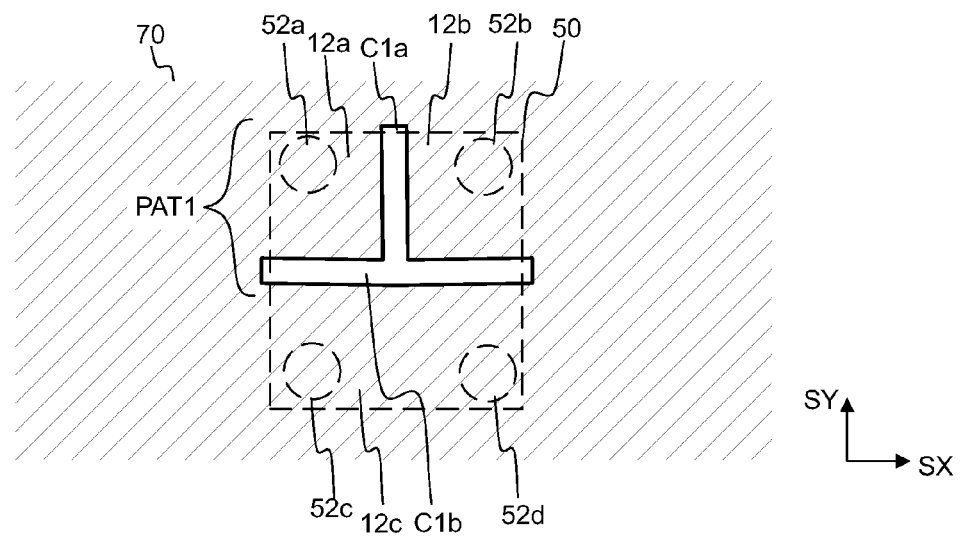
FIG. 15 shows, in a top view, a T-shaped preliminary pattern consisting of preliminary grooves.

Referring to FIG. 15, three terminal portions 12a, 12b, 12c may be defined by forming a T-shaped preliminary pattern PAT1, i.e. the shape of the pattern PAT1 may resemble the shape of the letter "T".

Figure 16A:
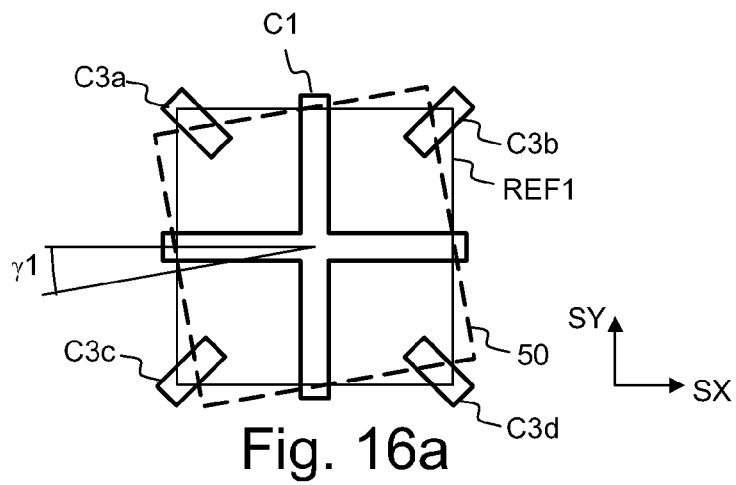
FIG. 16a shows, in a top view, monitoring angular mis-alignment of an RFID chip by using one or more inspection holes.
Figure 16B:
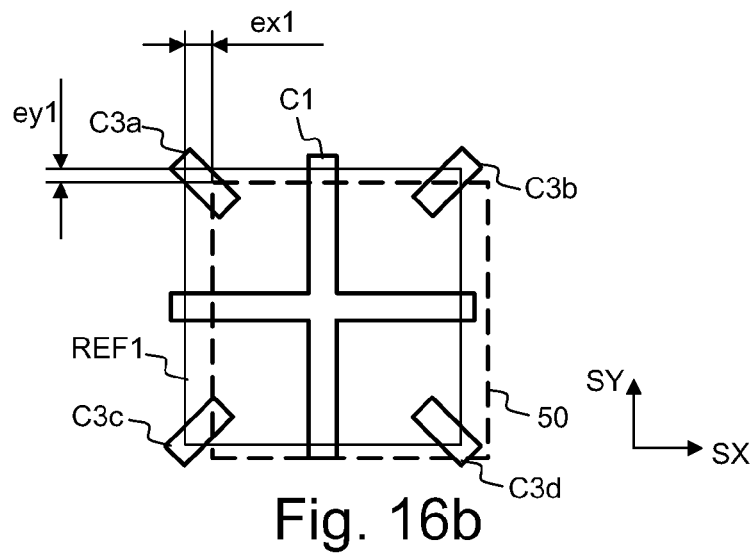
FIG. 16b shows, in a top view, monitoring translational misalignment of an RFID chip by using one or more inspection holes.
Figure 16C:
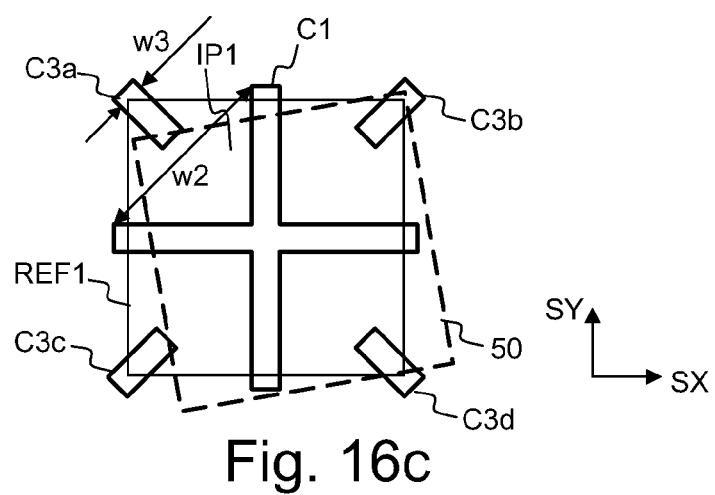
FIG. 16c shows, in a top view, monitoring angular and translational mis-alignment of an RFID chip by using one or more inspection holes.

FIGS. 16a-16c show misaligment of the chip 50. FIG. 16a shows an angular displacement where the chip has been rotated by an angle γ1 around a rotation axis, which is parallel to the direction SZ. FIG. 16b shows a translational displacement where the displacement in the direction SX is equal to ex1 and the displacement in the direction SY is equal to ey1. FIG. 16c shows combined angular and translational displacement of the chip 50 with respect to an optimum reference position REF1.

The position of the chip 50 with respect to the groove C1 may be monitored by using an optical camera CAM1 (FIG. 11). The chip 50 and the camera CAM1 may also be positioned at different sides (i.e. upper and lower sides) of the conductive sheet 70. In that case the position of the chip 50 may be optically monitored through the groove C1 after the chip has been attached to the sheet.

The accuracy of detecting the position of the chip may be improved by optically monitoring through one or more inspection holes C3a, C3b, C3c, C3d. An inspection hole C3a, C3b, C3c, C3d may be formed before attaching the chip to the sheet 70. Advantageously, an inspection hole C3a, C3b, C3c, C3d may be located such that it coincides with a corner of a chip 50. The width w3 of the inspection hole may be e.g. greater than or equal to the maximum allowable displacement (ex1 or ex2) of the chip with respect to the reference position. In order to preserve the dimensional stability (stiffness) of the internal protrusion IP1, the width w3 of the inspection hole may be e.g. smaller than 30% of the width w2 of the internal protrusion.

FIGS. 2-16c and 18a-19f show manufacturing steps for producing a transponder 100, which has a dipole antenna. Said manufacturing steps may also be suitable for producing a transponder 100 comprising a coil antenna CA1 (see FIGS. 17a-17d). Said manufacturing steps may also be suitable for producing a transponder 100 comprising three or more antenna elements. Said manufacturing steps may also be suitable for producing a transponder 100 comprising one or more further electrical parts in addition to the chip and the antenna. For example the transponder may comprise a tamper detection loop, to a battery, and/or to a sensor. The chip 50 may be electrically connected to a tamper detection loop, to a battery, and/or to a sensor. The sensor may be e.g. a temperature sensor, a humidity sensor, a chemical sensor, or a strain sensor. In all these cases, a preliminary groove may be formed before the chip is attached to the conductive sheet, wherein the groove is positioned between a first connecting element and a second connecting element of the chip 50. The (final) shape of the conductive areas and wires of the transponder may be cut by a laser after the chip has been attached.

FIG. 17a shows a transponder 100 comprising a coil antenna CA1 connected to the chip 50. While a first end of the coil antenna CA1 may be directly connected to the chip 50, the second end of the coil antenna CA1 (e.g. the inner part) may be connected to the chip 50 by a jump wire JMP1. The transponder 100 may be attached to a carrier sheet 81 in order to make an RFID tag.

FIG. 17b shows a transponder 100 where one or more turns of the coil antenna are arranged to pass between the connecting elements of the chip 50. In other words, one or more turns of the coil antenna are arranged to pass between the terminal portions 12a, 12b of the coil antenna CA. Thus the external jump wire JMP1 shown in FIG. 17a is not needed.

FIG. 17c shows a preliminary pattern PAT1 for producing the transponder of FIG. 17b. A first set of grooves C1a, C1b, C1c, C1d may be formed before attaching the chip 50. The grooves C1a, C1b, C1c, C1d may be substantially parallel and they may extend slightly beyond the borderline of the chip 50.

Terminal portions 12a, 12b and three conductor sections may be formed by cutting a second set of grooves C2 in the conductive sheet 70 e.g. along the lines LIN1, LIN2, LIN3, LIN4, LIN5, LING, LIN7, LIN8 by a laser after the chip has been attached.

In particular, a method for producing an RFID transponder may comprise:
- cutting two or more separate grooves C1a, C1b in a conductive sheet 70,
- attaching an RFID chip 50 onto a conductive sheet 70 such that the grooves C1a, C1b are located between connecting elements 52a, 52b of the chip 50, and
- cutting a groove C2 after the chip 50 has been attached by a laser beam LB2 so as to form a coil antenna of the RFID transponder 100.

In particular, the chip 50 may be attached to the conductive sheet 70 by an adhesive, which accurately fixes the positions of the grooves C1 with respect to the chip 50 before cutting the second set of grooves C2.

A coil antenna CA1 made of thin metal foil may be very easily deformed. The outer region OR1 surrounding the first set of grooves C1 may improve dimensional stability of the grooves C1. If the second set of grooves C2 would be cut before attaching the chip 50, the dimensional stability and positioning accuracy of the terminal portions 12a, 12b and the grooves C1a, C1b, C1c, C1d could be poor.

Figure 17D:
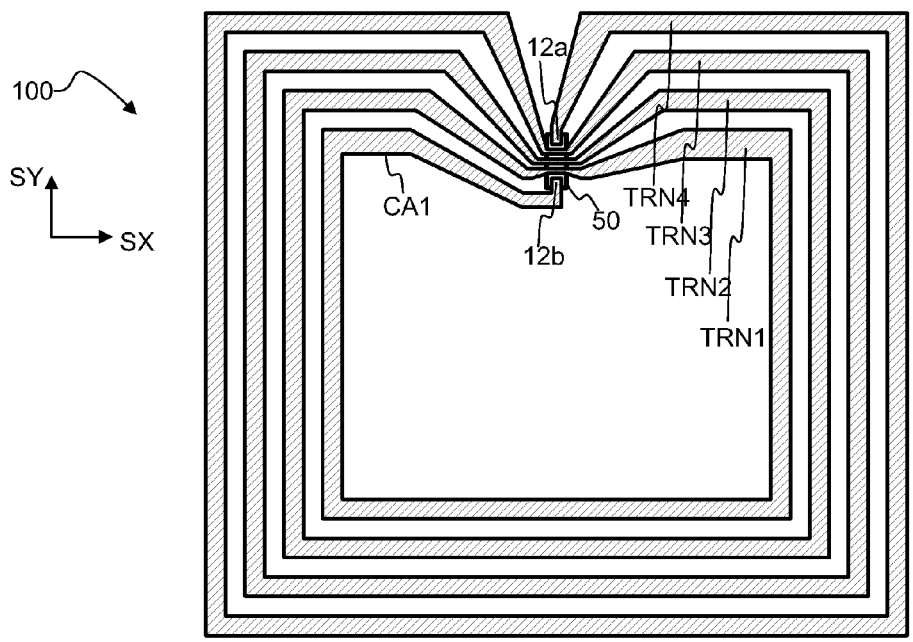
FIG. 17d shows, in a three dimensional view, an RFID transponder having a coil antenna implemented without a jump wire.

FIG. 17d shows how the turns TRN1, TRN2, TRN3 of the coil antenna CA1 pass through a space between the terminal portions 12a, 12b. The end of the turn TRN4 forms the terminal portion 12a. The preliminary grooves C1a, C1b, C1c, C1d define portions of the turns located between the terminal portions 12a, 12b. A transponder 100 comprising the coil antenna CA1 may be substrateless or it may be fixed to a carrier sheet 81 so as to provide an RFID tag/inlay.

FIGS. 18a-18d show forming a plurality of second grooves (slots) C2 such that the antenna elements 10a, 10b are connected to the outer portion OR1 by one or more links 72. The links 72 may consist of the conductive material of the sheet 70. The links 72 may help to hold the antenna elements 10a, 10b and the terminal portions 12a, 12b in place before the transponder 100 is separated from the outer portion OR1.

One or more first grooves C1 may be formed before attaching the chip 50, and the plurality of second grooves C2 may be cut by a laser 250 after the chip 50 has been attached to the conductive sheet 70.

A plurality of slots C2 may be cut by using a laser beam LB2. At this stage, a plurality of links 72 may remain between the slots C2. The links 72 comprise material of the conductive sheet 70. The links 72 may temporarily support the antenna elements 10a, 10b and the chip 50. At a later stage, the antenna elements 10a, 10b may be completely separated from the outer portion OR1 of the conductive sheet 70 by breaking the links 72. The links may also be called as braces.

FIG. 18a shows, in a top view, the slots C2 cut by using the laser beam LB2.

Figure 18B:
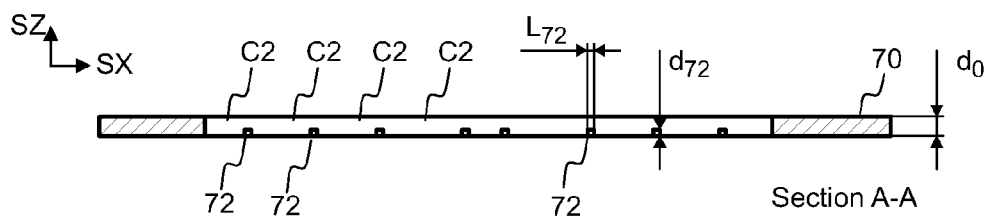
FIG. 18b shows, in a cross-sectional side view, the links of FIG. 18a, FIG. 18c shows, in a three dimensional view, cutting the links of FIG. 18a, FIG. 18d shows, in a side view, an apparatus for producing RFID tags, wherein the apparatus is arranged to produce links, which connect the antenna element to the outer portion of the conductive sheet.

FIG. 18b shows, in a cross-sectional side view, the slots C2 cut by using the laser beam LB2. The cross-section relates to the line A-A shown in FIG. 18a.

The width $L_{72}$ of the links 72 and the thickness $d_{72}$ of the links 72 may be selected such that the antenna elements 10a, 10b may be easily separated from the outer portion OR1 of the conductive sheet 70. The thickness $d_{72}$ may be smaller than the thickness $d_0$ of the conductive sheet 70 in order to facilitate separation. The thickness $d_{72}$ may be controlled e.g. by adjusting intensity or of the laser beam LB2.

The thickness $d_{72}$ may also be equal to the thickness $d_0$ of the conductive sheet 70.

Figure 18C:
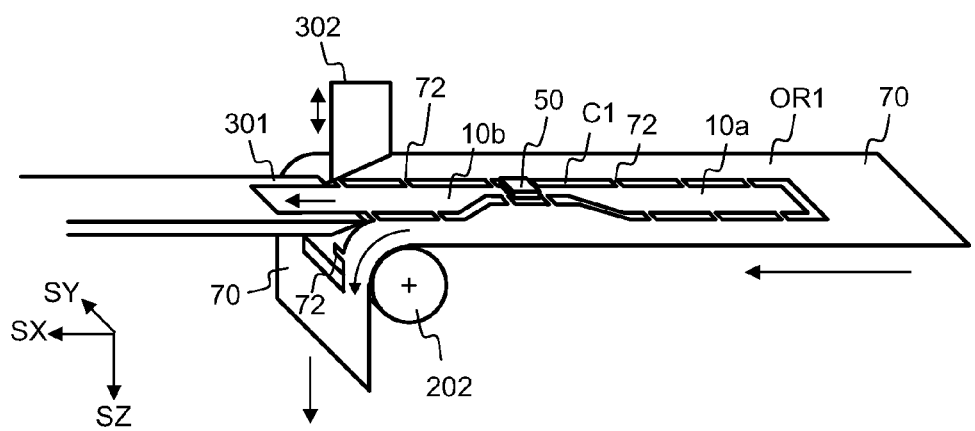

FIG. 18c shows a method for separating the antenna elements 10a, 10b from the outer portion OR1 of the conductive sheet 70. After cutting with the laser, the elements 10a, 10b may be attached to the outer portion by the links 72. The links 72 may be broken in order to separate the elements from the outer portion. The elements 10a, 10b may be pulled or pushed away from the outer portion in order to break the links 72.

A portion of the sheet 70 may be bent by tensioning the sheet 70 around a bending member 202. The bending member may be e.g. by a roll 202. Consequently, an end portion of the element 10b may protrude with respect to the bent portion of the sheet 70. A separating member 301 may be arranged to push the protruding antenna element 10b away from the outer portion of the sheet 70 when the bent sheet 70 is moved with respect to the bending member 202. The separating member 301 may be a wedge.

The position of the links 72 may be selected such that the end of the antenna element 10b may protrude with respect to the outer portion of the sheet 70 when the sheet 70 is bent.

The dimensions of the links 72 or bridge elements 72 may be selected such that the antenna elements may be separated from the outer portion OR1 by just by pulling or pushing the antenna elements, i.e. the use of a cutting blade 302 is not necessary.

However if desired, the apparatus may further comprise one or more cutting edges 302 for cutting the links 72 or bridge elements S1 (FIG. 19e). The cutting edges may be movable or stationary. The roller 202 may comprise one or more cutting edges.

Figure 18D:
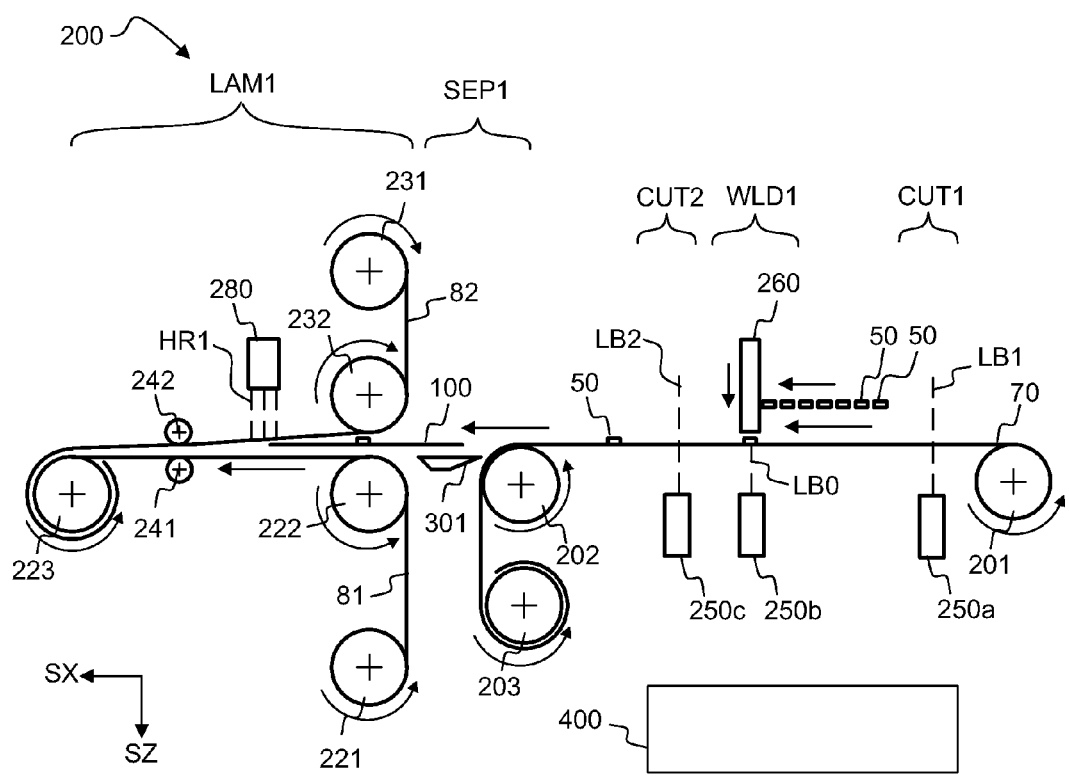

FIG. 18d shows an apparatus 200 for producing laminated RFID tags. A conductive sheet 70 may be moved by rolls 201, 202, 203. One or more preliminary grooves C1 may be cut with a laser beam LB1 provided by a laser 250a. Chips 50 may be dispensed onto the sheet 70 by a holder 260. The chips 50 may be bonded to the sheet by a welding/soldering laser beam LB0 provided by a laser 250b. The antenna elements 10a, 10b may be cut by a laser beam LB2 provided by the laser 250c. The transponders 100 may be separated from the outer portion of the sheet 70 by bending the sheet around the roll 202 and by pushing the antenna elements by the separating member 301.

A first sheet 81 may be moved by rolls 221, 222, 223. A second sheet 82 may be moved by rolls 231, 232, 223. The sheets 81, 82 may be moved substantially at the same speed as the conductive sheet 70.

The rolls 222, 232 may form a nip, which grabs the end of the antenna element, and which pulls the RFID transponder 100 such that it can be laminated between the sheets 81, 82. The lamination may be assisted by using pressure rolls 241, 242. If needed, heat for the lamination may be provided by a heating unit 280.

The laminated RFID transponders 100 may be collected around the roll 223. The laminated RFID transponders 100 may be delivered as sheets wound in reel. The sheet may comprise a one-dimensional or a two-dimensional array of RFID transponders 100. Individual RFID transponders 100 or RFID tags 110 may be separated from the sheet at a later stage e.g. by die-cutting or along perforations.

CUT1 denotes a zone where one or more first grooves C1 are formed. WLD1 denotes a zone where the chip 50 is bonded to the conductive sheet 70. CUT2 denotes a zone where one or more second grooves C2 are cut. SEP1 denotes a zone where the RFID transponders 100 are separated from the outer portion of the conductive sheet 70. LAM1 denotes a zone where the RFID transponders 100 are laminated between protective sheets 81, 82.

The operation of the apparatus 200 may be controlled by a control unit 400. The control unit 400 may be configured to control e.g. the velocities of the sheets 70, 81, 82, movements of the laser beams, and laser power.

FIGS. 19a-19f show forming antenna elements 10a, 10b, by using supporting bridges S1. The purpose of the bridges S1 is to temporarily support or "rigidize" the antenna elements 10a, 10b after a substantially continuous gap E0 surrounding the antenna elements 10a, 10b has been formed. Without the bridges S1, the antenna elements 10a, 10b might move in an uncontrollable way and/or they might become wrinkled when they are separated from the remaining portion OR1 of the sheet 70.

Figure 19A:
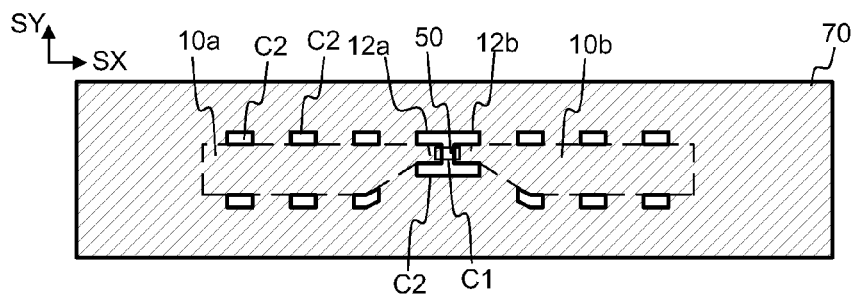
FIG. 19a shows, in a top view, producing a first group of slots.

FIG. 19a shows a first step, where a first group of secondary slots C2 is cut in the conductive sheet 70. One or more first grooves C1 have been formed and the chip has been attached to the sheet 70 before cutting the secondary slots C2.

Figure 19B:
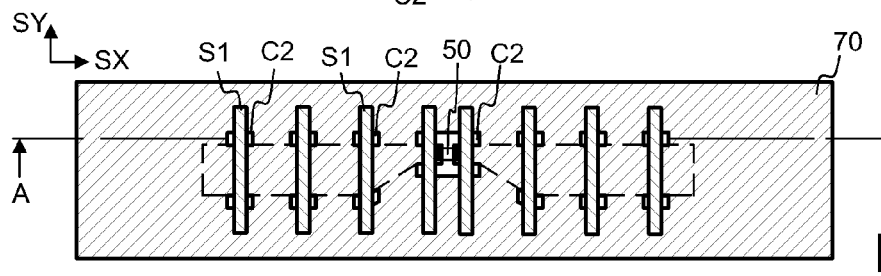
FIG. 19b shows, in a top view, forming supporting bridges, which coincide with the slots of the first group.

FIG. 19b shows a second step, where a plurality of supporting bridges S1 are formed on the conductive sheet 70 such that the locations of the bridges S1 substantially coincide with the locations of the slots C2.

The material of the bridges S1 may be substantially electrically insulating. In other words, the bridges S1 may consist of dielectric material. In that case, some bridges S1 connecting different parts of an antenna element 10a, 10b, CA1 may remain even in a final RFID tag/inlay.

The bridges S1 may be made e.g. from polyurethane lacquer, hot melt adhesive, or a lacquer curable by ultraviolet (UV) light. The material of the bridges S1 may be dispensed on the conductive sheet 70 e.g. by one or more nozzles (not shown). Hardening of a lacquer may be accelerated also by heating or by using a hardening agent.

A part of the material of the bridges S1 may also penetrate into the slots C2.

Figure 19C:
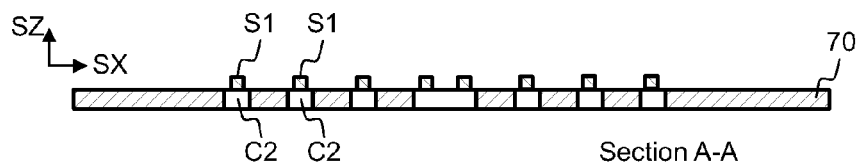
FIG. 19c shows, in a cross-sectional side view, the bridges of FIG. 19b.
Figure 19D:
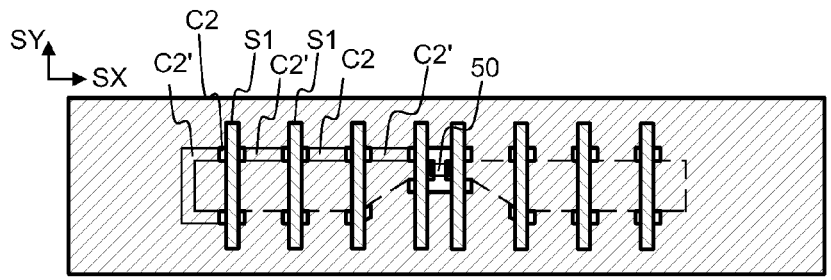
FIG. 19d shows, in a top view, producing a second group of slots such that slots of the first group and slots of the second group together substantially separate the antenna elements from the outer portion of the conductive sheet.
Figure 19E:
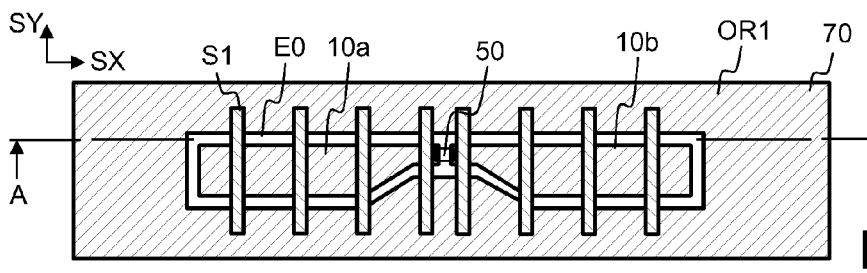
FIG. 19e shows, in a top view, a substantially continuous groove surrounding the antenna elements.

FIG. 19c shows, in a cross-sectional side view, the bridges S1 of FIG. 19b. FIG. 19c is a cross-section along the line A-A of FIG. 19b.

In a third step, a second group of secondary slots C2' may be formed by a laser beam such that the slots C2' adjoin the slots C2 of the first group. The marking C2' in FIG. 19d indicates an area where a slot C2' will be produced. The locations of the bridges S1 do not coincide with the locations of the areas C2'. Thus, the bridges S1 do not prevent cutting with the laser. Preferably, the slots C2' are through holes, i.e. they are not blocked by any substrate.

Referring to FIG. 19e, a substantially continuous groove E0 may be formed by joining the slots C2 of the first group with the slots C2' of the second group such that the slot E0 substantially surrounds the antenna elements 10a, 10b. Thus, the continuous groove E0 may be formed as a combination of the adjoining slots C2 and C2'.

Figure 19F:
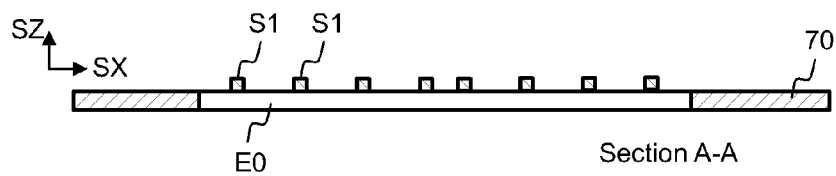
FIG. 19f shows, in a cross-sectional side view, the slot of FIG. 19e.

FIG. 19f shows, in a cross-sectional side view, the substantially continuous groove E0. FIG. 19f is a cross-section along the line A-A shown in FIG. 19e.

Thus, a method of producing a RFID transponder 100 comprising an antenna element 10a may comprise in the following order:
   forming a first groove C1 in a conductive sheet 70,
   attaching a chip 50 to the sheet 70 such that the first groove C1 is located between connecting elements 52a, 52b of the chip 50,
   cutting a first secondary slot C2,
   providing a supporting bridge S1 such that the location of the bridge S1 substantially coincides with the location of the first secondary slot C2, and
   cutting a second secondary slot C2' adjoining the first secondary slot C2.

The antenna element 10a may be subsequently separated from a remaining portion of the conductive sheet by cutting the bridges S1. The separated RFID transponder 100 may be laminated between (flexible) substrates so as to form an RFID inlay (FIGS. 7b-7d). The separated RFID transponder 100 may be directly attached to a product 700a (FIG. 21) in order to minimize process steps and/or in order to minimize the use of substrates.

Instead of applying individual bridges S1, a plurality of bridges S1 may be laminated onto the conductive sheet 70 e.g. as a mesh structure.

The width $d_{C1}$ of the first groove C1 may be e.g. in the range of 0.2 mm to 1.0 mm.

The manufacturing apparatus 200 may comprise an RF performance monitor (radio frequency performance monitor) for monitoring RF performance of the RFID transponders. If deviation from ideal performance is detected, the control unit 400 may be configured to adjust process parameters such that optimum performance may be attained.

The control (i.e. RF tuning) may be carried out on-line. The cutting of the terminal portions 12a, 12b may be controlled based on feedback. Feedback for controlling processing a present transponder may be obtained by measuring a property of a previously processed transponder and/or by measuring a property of the present transponder. In other words, a dimension of an antenna element a first RFID transponders may be changed (by laser cutting) based on information obtained from the first RFID transponder. A dimension of an antenna element a second RFID transponders may be changed (by laser cutting) based on information obtained from the first RFID transponder.

Figure 20:
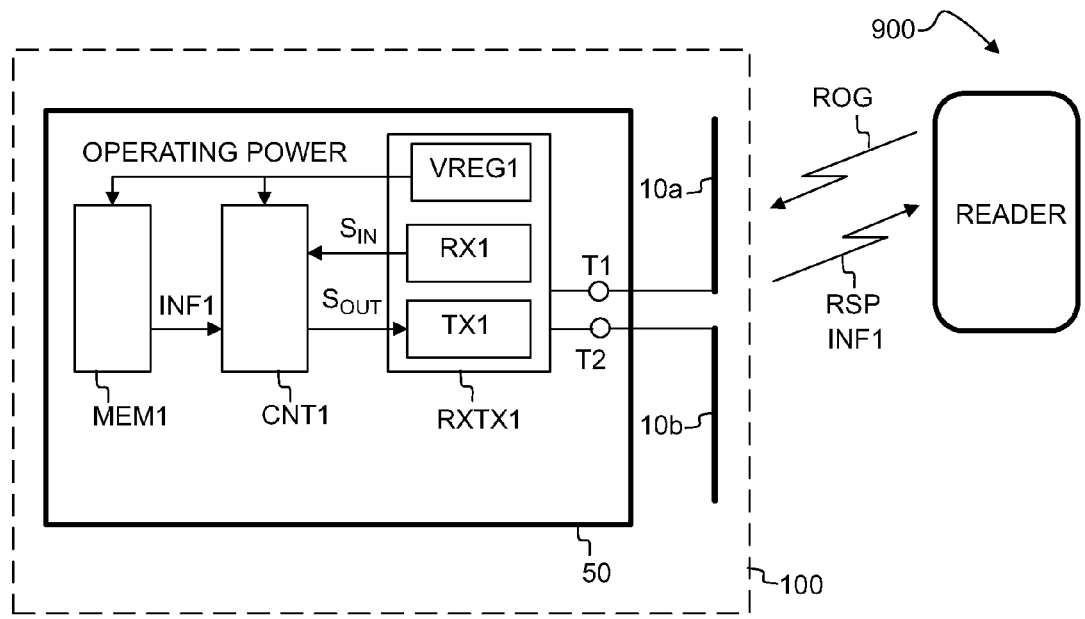
FIG. 20 shows functional units of an RFID transponder.

Referring to FIG. 20, a radio frequency identification transponder 100 may be arranged to send a response RSP to an interrogation signal ROG. The interrogation signal ROG may be sent from a portable or stationary reader 900.

The transponder 100 may comprise a communication block connected to one or more antenna elements 10a, 10b via terminals T1, T2. The terminals T1, T2 may be galvanically connected to the contact elements 52a, 52b of the chip 50.

The communication block may be implemented in an RFID chip 50. The communication block may comprise a radio frequency unit RXTX1, a control unit CNT1, and a memory MEM1. The radio frequency unit RXTX1 may comprise a signal receiver RX1, and a signal transmitter TX1.

The radio frequency unit RXTX1, the control unit CNT1, and the memory MEM1 may be implemented on the same semiconductor chip 50.

The receiver RX1 may provide an input signal SIN based on the received interrogation signal ROG. The control unit CNT1 may be arranged to enable transmission of the information INF1 e.g. when the input signal SIN contains a correct password code.

The response RSP transmitted by the transponder 100 may comprise information INF1. The information INF1 may comprise e.g. an electronic item code (EPC). The information INF1 may be retrieved from the memory MEM1 by the control unit CNT1. The control unit CNT1 may send an output signal SOUT to the radio frequency unit RXTX1. The output signal SOUT may comprise the information INF1. The transmitter TX1 may generate the radio-frequency response RSP based on the output signal SOUT.

The radio frequency unit RXTX1 may comprise a voltage supply VREG1, which is arranged to extract operating power from an incoming radio frequency signal.

FIG. 21 shows a plurality of tagged items 700a, 700b, 700c. An RFID transponder 100a may be attached to the item 700a, An RFID transponder 100b may be attached to the item 700b, and An RFID transponder 100c may be attached to the item 700c.

Each transponder 100a, 100b, 100c, may be arranged to transmit a response RSP to an interrogation signal ROG. A response transmitted by the transponder 100a may comprise information INF1a associated with the item 700a. A response transmitted by the transponder 100b may comprise information INF1b associated with the item 700b. A response transmitted by the transponder 100c may comprise information INF1c associated with the item 700c.

The information INF1 may e.g. comprise identification data for each transponder 100 so that the number of the items 700a, 700b, 700c can be counted, and the type of the items can be identified.

The reader 900 may comprise a body 910 and a user interface 920. The user interface 920 may comprise e.g. a visual display for displaying information sent by the transponders 100, 100a, 100b, 100c. The user interface 920 may comprise a keyboard for receiving data and/or commands.

The radio frequency unit RXTX1 may comprise a signal receiver RX1, and a signal transmitter TX1. The receiver RX1 may also be called as a signal demodulator. The transmitter TX1 may also be called as a signal modulator. The radio frequency unit RXTX1 may also be called as an analog radio frequency interface.

The radio frequency unit RXTX1 may comprise connection terminals T1, T2, which may be connected to at least one antenna 10a, 10b. The at least one antenna may be a dipole antenna, which comprises a pair of antenna elements 10a, 10b. A first terminal T1 may be connected to a first element 10a, and a second terminal T2 may be connected to a second element 10b. Alternatively, the first terminal T1 may be connected to an antenna 10a, and the second terminal T2 may be connected to an electrical ground (not shown). Alternatively, the terminals T1, T2 may be connected to a coil antenna CA1 (FIG. 17b).

In particular, the information INF1 may comprise an electronic item code (EPC). A unique electronic item code assigned to an item may be stored in the tag 200 as a binary number. In particular, a bit string may include information regarding an item such as its retail price, manufacturer, type of the item, serial number, for example.

The input signal SIN and the output signal SOUT may be digital signals.

The reader 900 and the transponder 100 may be arranged to communicate according to a far field communication protocol. The reader 900 and the transponder 100 may be arranged to communicate according to the same RFID communication standard. In particular, the reader 900 and the transponder 100 may be arranged to communicate according to one or more of the following standards:

ISO/IEC 18000-2A (frequency band 125/134.2 kHz, reading distance e.g. up to 2 m)

ISO/IEC 18000-2B (frequency band 125/134.2 kHz)

ISO 18000-3 (frequency band 13.56 MHz, reading distance e.g. up to 3 m)

ISO 18000-7 (frequency band 433 MHz)

ISO 18000-6A (frequency band 860-960 MHz, reading distance e.g. up to 3 m)

ISO 18000-6B (frequency band 860-960 MHz)

ISO 18000-6C (frequency band 860-960 MHz)

EPCglobal Class 0 (frequency band 860-960 MHz)

EPCglobal Class 1 (frequency band 860-960 MHz)

EPCglobal Class 1 Gen 2 (frequency band 860-960 MHz)

ISO 18000-4 (frequency band 2.45 GHz, reading range e.g. up to 12 meters)

(Reference is made to the latest versions of the standards as in force on 22 Nov. 2011).

The reader 900 and the tag 100 may be arranged to communicate according to a near field communication protocol (NFC). In particular, the reader 900 and the tag 100 may be arranged to communicate according to one of the following standards:

Proximity cards: ISO/IEC 14443 (frequency band 13.56 MHz, reading distance e.g. up to 12.5 cm)

Vicinity cards: ISO/IEC 15693 (frequency band 13.56 MHz, reading distance e.g. up to 1.5 m)

(Reference is made to the latest versions of the standards as in force on 22 Nov. 2010).

The radio frequency unit RXTX1 may comprise a voltage supply VREG1, which is arranged to extract operating power from an incoming radio frequency signal. In particular, the voltage supply VREG1 may be arranged to extract operating power from the interrogation signal ROG. The operating power may be distributed to the control unit CNT1, to the memory MEM1 and/or to the radio frequency unit RXTX1 itself.

The transponder 100 may be a passive device which does not comprise a battery. The transponder 100 may be powered e.g. by electromagnetic energy transmitted from the reader 900. In particular, the combination of an antenna structure 10a, 10b, CA1 and a radio frequency unit RXTX1 of a transponder 100 may be arranged to provide operating power for the transponder 100 by extracting energy of an in-coming electromagnetic signal ROG.

A dipole antenna 10a, 10b may transmit information INF1 from the tag 200 to the reader 900 by back scattering. Alternatively, an inductive antenna may be used. A coil antenna CA1 of the transponder 100 may cause modulation of the load for the reader 900. This modulation can be used for transmitting data from the transponder 100 to the reader 900.

The transponder 100 may be an active device, which comprises a battery for providing operating power for the radio frequency unit RXTX1.

The transponder 100 may be battery-assisted, i.e. power provided by a battery may be used for processing information and/or storing information in the memory MEM1, and the response RSP may be transmitted by using reflected power of the interrogation signal ROG (by using passive reflected power).

The transponder 100 may comprise a capacitor or rechargeable battery for storing operating energy extracted from an interrogation signal ROG.

Electromagnetic interrogation signal ROG transmitted in a wireless manner is converted into an electrical signal by the antenna elements 10a, 10b. The electrical signal is connected to the receiver RX1 of the radio frequency unit RXTX1 via the connection terminals T1 and T2. Also the electrical signal is a radio frequency signal, which oscillates at the same frequency as the electromagnetic signal.

The chip 50 may comprise a transponder 100 implemented by integrated circuits. The antenna elements 10a, 10b, CA1 and the chip 50 may be supported on a carrier sheet 81, 82. The carrier sheet 81, 82 may be e.g. paper, cardboard, or plastic film.

However, in an embodiment, the antenna elements may be implemented without a substrate. In an embodiment, less than 20% of the surface area of the antenna element (10a, 10b, CA1) may be covered by a dielectric material.

The total thickness of a tag 110 or a transponder 100 (in the direction SZ) may be smaller than or equal to 1 mm. The tag 110 or a transponder 100 may be flexible. A tag 110 may further comprise an adhesive layer (not shown). A tag 110 may further comprise a release layer, which protects the adhesive layer. The release layer can be removed before the tag 110 is attached to an item (e.g. 700a) by the adhesive layer.

The tag 110 or a transponder 100 may be attached or associated with an item 700a (See FIG. 21). The item 700a may be a product, e.g. a television, mobile phone, component of an automobile. The item 700a may be a package containing an item, a package containing foodstuff, a package containing medicine, a package containing a chemical substance.

In an embodiment, an item 700a may be substantially thicker than an RFID transponder 100 or an RFID tag 110. The thickness of the item 700a may be e.g. greater than or equal to 10 mm. In an embodiment, an RFID transponder 100 may be embedded in the item 700a or otherwise attached to the item 700a such there is no need to use a substrate film between the antenna element(s) and the item 700a. Thus, the use of materials may be minimized in an environmentally friendly way.

A plurality of tagged items 700a, 700b, 700c may stored in a storage, and a user may rapidly make an inventory of the items 700a, 700b, 700c stored in said storage by receiving the information INF1.

Advantageously, the chip 50 comprises encapsulation (i.e. housing). Two or more portions of the outer surface of chip 50 may be electrically conductive such that they can be used as the contact elements 52a, 52b. The contact elements 52a, 52 are exposed before they are electrically connected to the antenna portions 10a, 10b.

The contact elements 52a, 52b may protrude from the (dielectric) encapsulation.

Contact elements 52a, 52b of an RFID chip may be bonded to the antenna elements 10a, 10b e.g. by laser welding or by laser soldering.

Laser welding may comprise heating the surface of a contact element 52b by a laser beam LB0 to a temperature, which is higher than the melting point of the conductive sheet 70.

A contact element 52b may comprise a core coated with a solder material. The melting temperature of the solder material may be lower than the melting point of the core in order to maintain the dimensions of the contact element 52b during bonding. Laser soldering may comprise heating the surface of a contact element 52b by a laser beam LB0 to a temperature, which is higher than the melting temperature of a solder material, and lower than the melting temperature of the conductive sheet 70.

In an embodiment, the electrical contact between the contact elements 52a, 52b and the antenna elements 10a, 10b may be formed by an electrically conducting adhesive, i.e. without using laser welding or soldering. In particular, the adhesive may be an anisotropically conductive adhesive (anisotropically conductive paste, ACP).

The chip 50 may be more securely fastened to the antenna elements 10a, 10b by using an adhesive ADH1 between the chip 50 and the antenna elements 10a, 10b.

The encapsulation may be arranged to mechanically protect the electronic components of the chip 50 and/or to prevent corrosion of the electronic components. In particular, the encapsulation may protect the electronic components from moisture. The moisture may induce corrosion and may have and adverse effect on the electrical properties of the electronic components. The encapsulation may comprise e.g. polymer material and/or ceramic material. The polymer material may comprise e.g. thermoplastic polymer, thermosetting polymer or elastomer. The electronic components of the chip 50 may be e.g. transistors, diodes, capacitors and resistors implemented on a layer of semiconductor material.

The hatching shown in FIGS. 18b, 19c, and 19f indicates a cross-section. The hatching shown in FIGS. 1-7c, 8a-8c, 8e-14d, 14h-15, 17c-18a, 19a, 19b, 19d, and 19e indicates the material of the conductive sheet. The hatching shown in FIGS. 1-7c, 8a-8c, 8e-14d, 14h-15, 17c-18a, 19a, 19b, 19d, and 19e does not indicate a cross-section.

In an embodiment, a first groove C1 may be formed in the conductive sheet 70 before attaching the chip 50, and a second groove C2 may be formed in the sheet 70 after the chip 50 has been attached so as to form an antenna element 10a of said transponder 100, wherein the second groove C2 may be formed e.g. by die-cutting or etching. In particular the second groove C2 may define the position of a terminal portion 12a of an antenna element 10a. Also in this case deviations in the positioning of the chip 50 may be compensated by forming the second groove C2 according to the detected position of the chip 50 with respect to the first groove C1. Also in this case, the accuracy of positioning the chip 50 with respect to the sheet 70 may be improved by attaching of the chip 50 to the sheet 70 before one or more second grooves C2 extending to the edge of the sheet 70 have been formed and/or before long internal protrusions are formed. The risk of damaging the chip 50 may be substantially reduced when the first groove C1 (preliminary pattern PAT1) is formed before attaching the chip 50.

The risk of damaging the chip 50 with a cutting blade (i.e. with a cutting die) may be substantially reduced when the second groove C2 is formed by die-cutting, as there is no need to cut the area under the chip 50.

In an embodiment, a chip 50 attached to the conductive sheet 70 may be (hermetically) encapsulated before the second groove C2 is formed by etching, because there is no need to etch the area under the chip 50. The encapsulation may protect the chip 50 during subsequent etching of the second groove C2.

For the person skilled in the art, it will be clear that modifications and variations of the devices and the methods according to the present invention are perceivable. The drawings are schematic. The particular embodiments described above with reference to the accompanying drawings are illustrative only and not meant to limit the scope of the invention, which is defined by the appended claims.

The invention claimed is:

1. A method for producing a radio frequency identification transponder, said transponder comprising a radio frequency identification chip and one or more antenna elements, the method comprising:
    forming a first groove in a conductive sheet such that a portion of said conductive sheet completely surrounds the first groove,
    attaching the chip to the conductive sheet after the first groove has been formed such that the first groove is located between a first connecting element of the chip and a second connecting element of the chip, and
    forming a second groove in the conductive sheet after the chip has been attached so as to form an antenna element of said transponder,
    wherein the antenna element is not attached to a dielectric substrate sheet.

2. The method of claim 1 wherein the second groove is cut by heating and/or ablating the conductive material of the sheet with a laser beam.

3. The method of claim 1 wherein the length of a closed path surrounding the first groove is smaller than or equal to ten times the circumference of the chip, and each point of said closed path is located on the conductive material of the conductive sheet.

4. The method according to claim 1 wherein a first dimension of the first groove in a first direction is greater than or equal to the maximum dimension of the chip in said first direction, and said first dimension of the first groove in said first direction is smaller than two times the maximum dimension of the chip in said first direction.

5. The method according to claim 1 comprising detecting the position of the chip after the chip has been attached, and adjusting the position of the second groove based on the detected position of the chip.

6. The method according to claim 1 comprising forming an internal protrusion in the conductive sheet such that the ratio of the width of the protrusion to the length of the protrusion is greater than or equal to 0.8, wherein the internal protrusion is at least partly defined by the first groove.

7. The method according to claim 1 wherein the conductive sheet is held against a surface of a holding unit by one or more clamping surfaces during forming the first groove.

8. The method according to claim 1 comprising holding the conductive sheet during forming the first groove by a tensioning force, which is substantially parallel to a surface of the conductive sheet.

9. The method according to claim 1 comprising forming the second groove such that the conductive sheet is pulled against a curved surface by tensioning forces.

10. The method according to claim 1 wherein the conductive sheet is held against a surface of a holding unit by one or more clamping surfaces during forming the second groove.

11. The method according to claim 1 wherein the conductive sheet is held against a surface of a holding unit by a pressure difference during forming the second groove.

12. The method according to claim 1 wherein the conductive sheet is held against a surface of a holding unit by gravity during forming the second groove.

13. The method according to claim 1 wherein the antenna element is connected to an outer portion of the conductive sheet by one or more links or bridges before the transponder is separated from the outer portion.

14. The method according to claim 1 comprising detecting the position of the chip optically through one or more openings formed in the conductive sheet.

15. The method according to claim 1 comprising forming two or more grooves in the conductive sheet before attaching the chip, wherein said two or more grooves define a portion of a coil antenna located between connecting elements of the chip.

16. A method comprising:
producing a radio frequency identification transponder, and
moving said transponder;
wherein said producing comprises:
forming a first groove in a conductive sheet such that a portion of said conductive sheet completely surrounds the first groove,
attaching a radio frequency identification chip to the conductive sheet after the first groove has been formed such that the first groove is located between a first connecting element of the chip and a second connecting element of the chip, and
forming a second groove in the conductive sheet after the chip has been attached so as to form an antenna element of said transponder,
wherein the antenna element is not attached to a dielectric substrate sheet.

17. The method of claim 16 wherein said moving comprises moving the transponder away from an outer portion of the conductive sheet by using a separating wedge.

18. The method of claim 16 wherein said moving comprises moving the transponder away from an outer portion of the conductive sheet by using a pressure difference.

19. The method of claim 16 wherein said moving comprises moving the transponder away from an outer portion of the conductive sheet by using a carrier sheet, which is at least partly covered with an adhesive.

* * * * *